United States Patent
Seo

(10) Patent No.: US 8,233,777 B2
(45) Date of Patent: Jul. 31, 2012

(54) DATA TRANSMITTING METHOD, RECORDING MEDIUM, APPARATUS FOR REPRODUCING DATA FROM RECORDING MEDIUM USING LOCAL STORAGE AND METHOD THEREOF

(75) Inventor: Kang Soo Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1249 days.

(21) Appl. No.: 11/331,069

(22) Filed: Jan. 13, 2006

(65) Prior Publication Data

US 2006/0159426 A1    Jul. 20, 2006

Related U.S. Application Data

(60) Provisional application No. 60/644,588, filed on Jan. 19, 2005.

(30) Foreign Application Priority Data

Nov. 16, 2005  (KR) ........................ 10-2005-0109693

(51) Int. Cl.
*H04N 5/84* (2006.01)
*H04N 5/89* (2006.01)
*H04N 9/80* (2006.01)
*H04N 5/93* (2006.01)
*H04N 5/92* (2006.01)
*G11B 27/00* (2006.01)
*G06K 9/00* (2006.01)
*G06K 9/68* (2006.01)

(52) U.S. Cl. ........ 386/332; 386/252; 386/278; 386/282; 386/326; 386/334; 386/336; 382/100; 382/112; 382/218; 382/219

(58) Field of Classification Search .................... 386/83, 386/94, 95, 326, 332, 336, 248, 255, 240, 386/252, 278, 282, 334; 382/100, 112, 218, 382/219

See application file for complete search history.

(56) References Cited

U.S. PATENT DOCUMENTS 7,322,513 B2    1/2008 Kuo et al.
(Continued)

FOREIGN PATENT DOCUMENTS

CN    1568446    1/2005
(Continued)

OTHER PUBLICATIONS

European Search Report dated Jan. 5, 2010 for corresponding Application No. 06700342.6.

(Continued)

*Primary Examiner* — Daquan Zhao
(74) *Attorney, Agent, or Firm* — Harness, Dickey & Pierce

(57) ABSTRACT

A method of transmitting encrypted data, recording medium including the encrypted data, apparatus for reproducing the same using a local storage and method thereof are disclosed. The present invention includes downloading a data associated with the recording medium to the local storage, constructing a virtual package by binding the downloaded data to a disc package within the recording medium, decrypting an indexing item of an index table within the virtual package using a key within a key file associated with the recording medium, and reproducing the decrypted indexing item, wherein information for solving a mismatch that occurs between the indexing item of the index table and an indexing item of the key file is included in the virtual package. By the present invention, the data associated with the recording medium is downloaded from outside to the local storage while contents provided by a content provider are protected. And, both of the data within the recording medium and the data within the local storage can be efficiently reproduced using a virtual package. Therefore, the present invention can provide more convenient functions to a user.

15 Claims, 15 Drawing Sheets

U.S. PATENT DOCUMENTS

| | | | |
|---|---|---|---|
| 7,639,923 B2 * | 12/2009 | Ikeda et al. | 386/335 |
| 2002/0112172 A1 * | 8/2002 | Simmons | 713/193 |
| 2002/0146122 A1 | 10/2002 | Vestergaard et al. | |
| 2002/0159592 A1 | 10/2002 | Matsushima et al. | |
| 2002/0186842 A1 | 12/2002 | Sabet-Sharghi et al. | |
| 2003/0086568 A1 | 5/2003 | Kato et al. | |
| 2003/0142827 A1 | 7/2003 | Ohwada et al. | |
| 2004/0139338 A1 * | 7/2004 | Ohmori et al. | 713/193 |
| 2005/0131998 A1 | 6/2005 | Takashima | |
| 2006/0014521 A1 | 1/2006 | Chen et al. | |
| 2006/0031873 A1 * | 2/2006 | Fahrny et al. | 725/31 |
| 2007/0073620 A1 | 3/2007 | Gandolph et al. | |

FOREIGN PATENT DOCUMENTS

| | | |
|---|---|---|
| EP | 1553769 | 7/2005 |
| EP | 1710950 | 10/2006 |
| JP | 2002-374244 | 12/2002 |
| JP | 2003-345660 | 12/2003 |
| JP | 2004-087063 | 3/2004 |
| JP | 2006-529963 | 5/2005 |
| JP | 2005-517494 | 8/2005 |
| JP | 2007-509513 | 4/2007 |
| JP | 2008-507793 | 3/2008 |
| JP | 2008-507795 | 3/2008 |
| RU | 2005-110957 | 9/2005 |
| WO | WO 2004/006250 | 1/2004 |
| WO | WO 2004/030356 | 4/2004 |
| WO | 2004/114303 A1 | 12/2004 |
| WO | WO 2005/052941 | 6/2005 |
| WO | WO 2005/055206 | 6/2005 |
| WO | WO 2005/071678 | 8/2005 |
| WO | WO 2005/074187 | 8/2005 |

OTHER PUBLICATIONS

Intel Corporation et al.: "Advanced Access Content System (AACT) Technical Overview (informative)" Internet Citation, [Online] Jul. 21, 2004, p. 32, XP007910652.

Blu-Ray Disc Foundars: "White paper Blu-ray Disc Format 2. A Logical and Audio Visual Application Format Specifications for BD-RE" Internet Citation, [Online] Aug. 2004, pp. 11-26, XP002480404.

International Search Report issued Jul. 6, 2006 in corresponding International Patent Application No. PCT/KR2006/000030.

Russian Notice of Allowance dated Mar. 26, 2010 for corresponding Application No. 2007/131426.

Notice of Allowance dated Jan. 27, 2011 for corresponding U.S. Appl. No. 11/311,210.

Japanese Office Action dated Feb. 8, 2011 in corresponding Japanese Application No. 2007-552051.

Japanese Office Action dated Jun. 10, 2011 in corresponding Japanese Application No. 2007-552051.

Chinese Patent Gazette dated Apr. 27, 2011 in corresponding Chinese Application No. 200680002456.5.

* cited by examiner

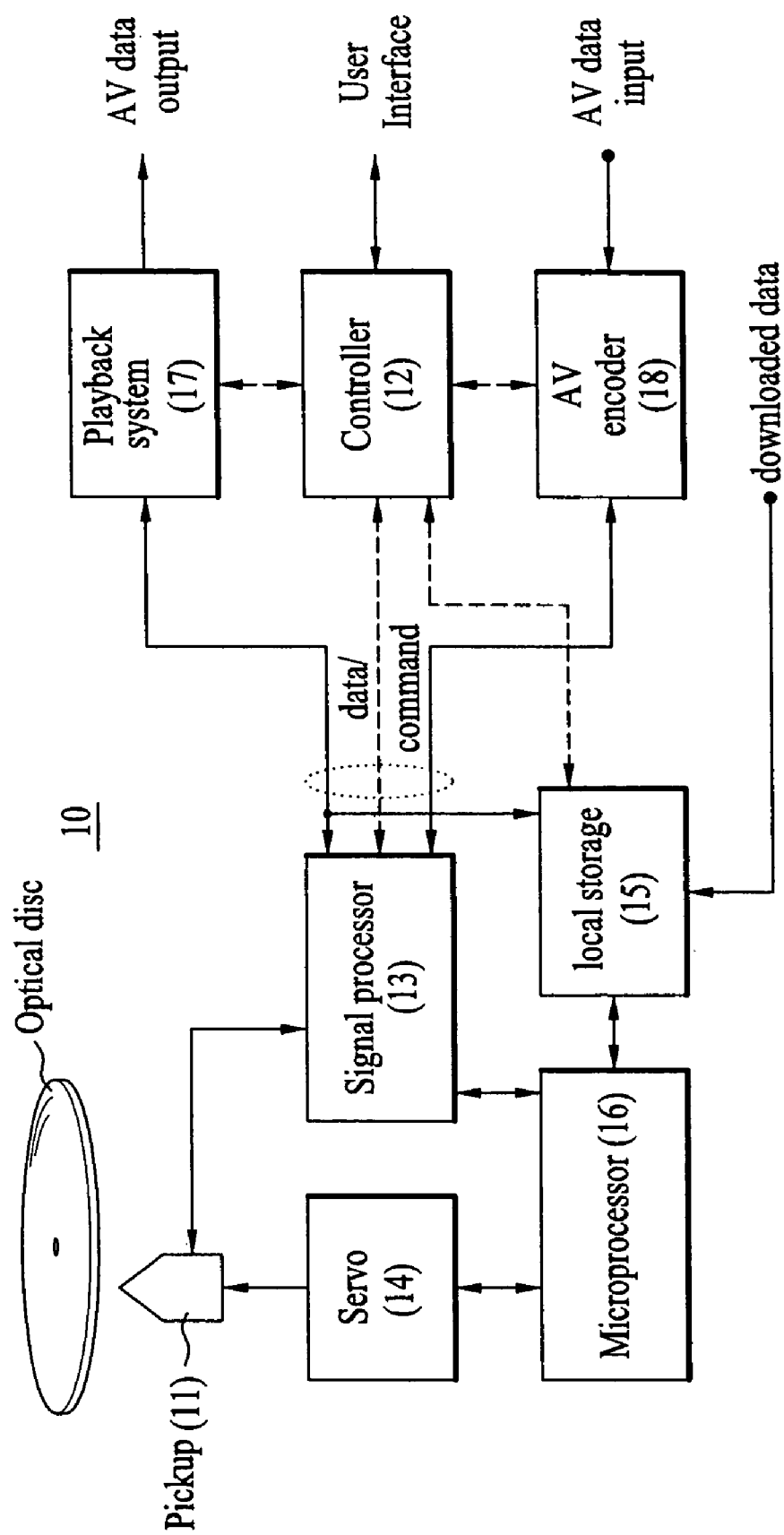

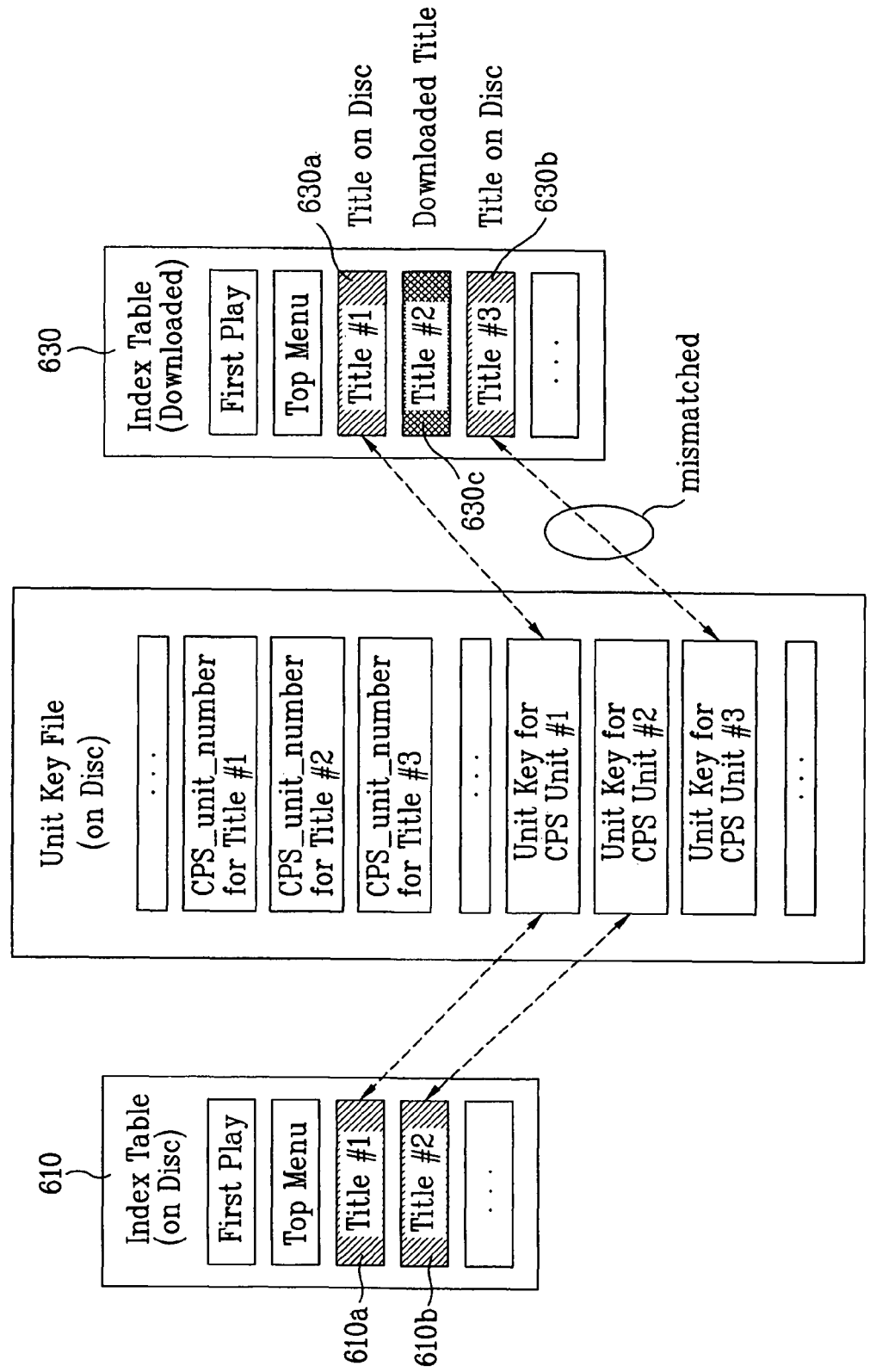

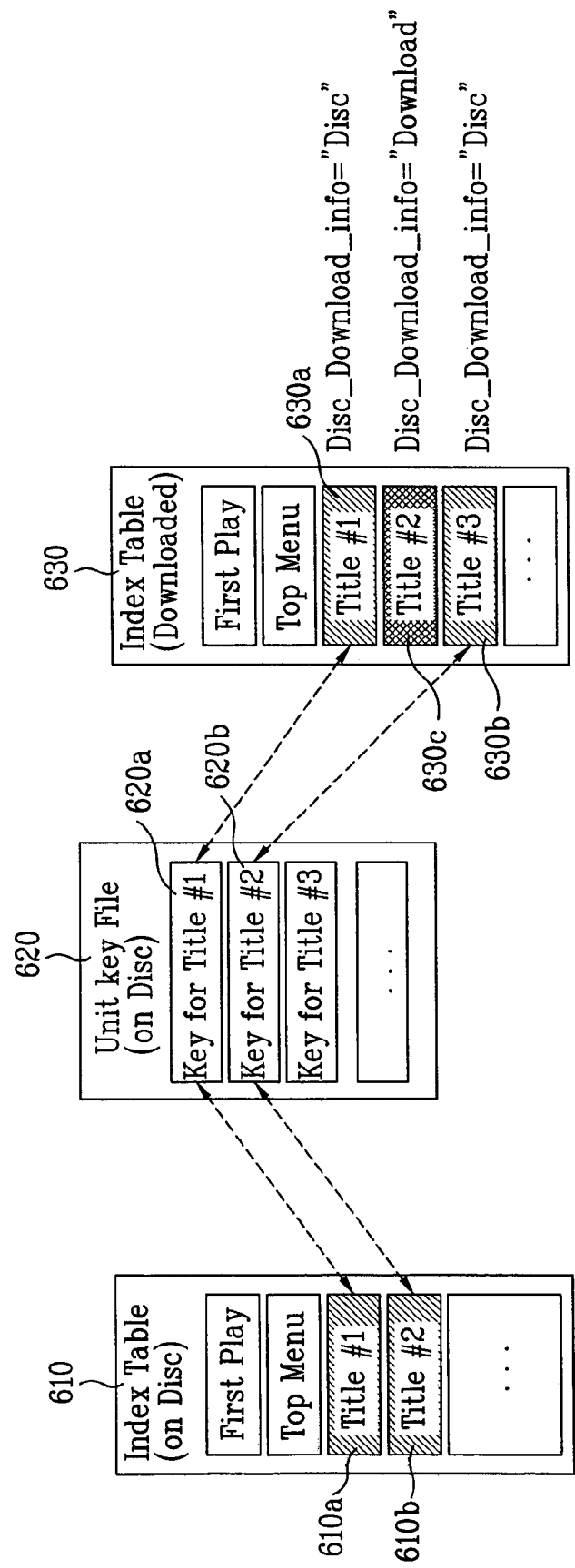

DATA TRANSMITTING METHOD, RECORDING MEDIUM, APPARATUS FOR REPRODUCING DATA FROM RECORDING MEDIUM USING LOCAL STORAGE AND METHOD THEREOF

This application claims the benefit of the U.S. Provisional Application No. 60/644,588, filed on Jan. 19, 2005, in the name of inventor Kang Soo SEO entitled "CONTENT PROTECTION RULE FOR BLU-RAY DISC", which is hereby incorporated by reference as if fully set forth herein.

This application claims the benefit of the Korean Patent Application No. 10-2005-0109693, filed on Nov. 16, 2005, which is hereby incorporated by reference as if fully set forth herein.

BACKGROUND OF THE INVENTION

1. Field of the Invention

The present invention relates to a playback of a recording medium using a local storage, and more particularly, to a method of transmitting encrypted data, recording medium including the encrypted data, apparatus for reproducing the same using a local storage and method thereof.

2. Discussion of the Related Art

Generally, optical discs capable of recording large-scale data as record media are widely used. Recently, a new high-density recording medium, e.g., Blu-ray disc (hereinafter abbreviated BD) has been developed to store video data of high image quality and audio data of high sound quality for long duration.

The BD as a next generation recording medium technology is a next generation optical record solution provided with data remarkably surpassing that of a conventional DVD. And, many efforts are made to research and develop the BD together with other digital devices.

An optical recording/reproducing device with the application of the Blu-ray Disc specifications starts to be developed. Yet, due to the incomplete Blu-ray disc specifications, the complete development of the optical recording/reproducing device has many difficulties.

Specifically, the optical recording/reproducing device should be provided with a basic function of recording and reproducing a Blu-ray disc (BD) and additional functions considering convergence with peripheral digital devices. Hence, it is expected that the optical recording/reproducing device should be provided with a general function of receiving to display an external input signal and a function of reproducing a BD together with the external input signal.

However, in reproducing the external input signal and the BD, since a preferable method of protecting shared data provided by a content provider has not been proposed or developed, many limitations are put on the development of a full-scale BD based optical recording/reproducing device.

SUMMARY OF THE INVENTION

Accordingly, the present invention is directed to a method of transmitting encrypted data, recording medium including the encrypted data, apparatus for reproducing the same using a local storage and method thereof that substantially obviate one or more problems due to limitations and disadvantages of the related art.

An object of the present invention is to provide a method of transmitting encrypted data, recording medium including the encrypted data, apparatus for reproducing the same using a local storage and method thereof, by which contents provided by a content provider can be protected and by which data within the recording medium and data within the local storage can be reproduced together using the local storage capable of storing recording medium associated data downloaded from outside.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reproducing a recording medium using a local storage according to the present invention includes the steps of downloading data associated with the recording medium to the local storage, constructing a virtual package by binding the downloaded data to a disc package within the recording medium, decrypting an indexing item of an index table within the virtual package using a key within a key file associated with the recording medium, and reproducing the decrypted indexing item, wherein information for solving a mismatch that occurs between the indexing item of the index table and an indexing item of the key file is included in the virtual package.

For example, the information identifies whether the indexing item of the index includes the downloaded data or not.

For example, the information is about a CPS unit to which the indexing item of the index table belongs.

For example, the information is indexing item identification information granted to each indexing item.

For example, the granted indexing item identification information is unchangeable.

For example, if the index includes a newly added indexing item including the downloaded data, new indexing item identification information is granted to the newly added indexing item.

For example, the key file is stored within the recording medium.

For example, the key file includes a downloaded key and is stored in the local storage.

In another aspect of the present invention, a recording medium includes a stream area in which contents are recorded and a database area for managing a reproduction of the contents, wherein an encrypted title is stored in the stream area and wherein a key file including a key defined with reference to title identification is stored in the database area.

For example, the key file includes a supplementary key stored for a downloaded title.

In another aspect of the present invention, an apparatus for reproducing a recording medium using a local storage includes a pickup reading data recorded on the recording medium, a local storage storing downloaded data associated with the recording medium, and a controller constructing a virtual package by binding the downloaded data to a disc package within the recording medium, the controller decrypting an indexing item of an index table within the virtual package using a key within a key file associated with the recording medium, the controller reproducing the decrypted indexing item, wherein the controller reads out the decryption key using information for solving a mismatch that occurs between the indexing item of the index table and an indexing item of the key file and wherein the information is included in the virtual package.

For example, the index table is provided from an outside of the recording medium by a content provider.

For example, the information is provided to identify whether the indexing item of the index table includes downloaded data or not.

For example, the information is about a CPS unit to which the indexing item of index belongs.

For example, the information is indexing item identification information.

In another aspect of the present invention, in transmitting a data associated with a recording medium from a content provider, a data transmitting method includes the step of transmitting information for solving a mismatch of indexing items that occurs between an indexing item of an index table enabling a reproduction of the data and an indexing item of a key file associated with the recording medium.

For example, the information is provided to identify whether the indexing item of the index table includes downloaded data or not.

For example, the information is about a CPS unit to which the indexing item of the index table belongs.

For example, the information is indexing item identification information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A is a block diagram of an optical recording/reproducing device according to the present invention;

FIG. 8A and FIG. 8B are diagrams for explaining error generated in the process of decrypting indexing items of an index table capable of reproducing downloaded data;

FIG. 9A and FIG. 9B are diagrams of a method of reproducing a recording medium using a local storage according to a first embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, for convenience of explanation, the present invention takes an optical disc, and more particularly, "Blu-ray disc (BD)" as an example of a recording medium. Yet, it is apparent that the technical idea of the present invention is identically applicable to other recording media.

Figure 1:
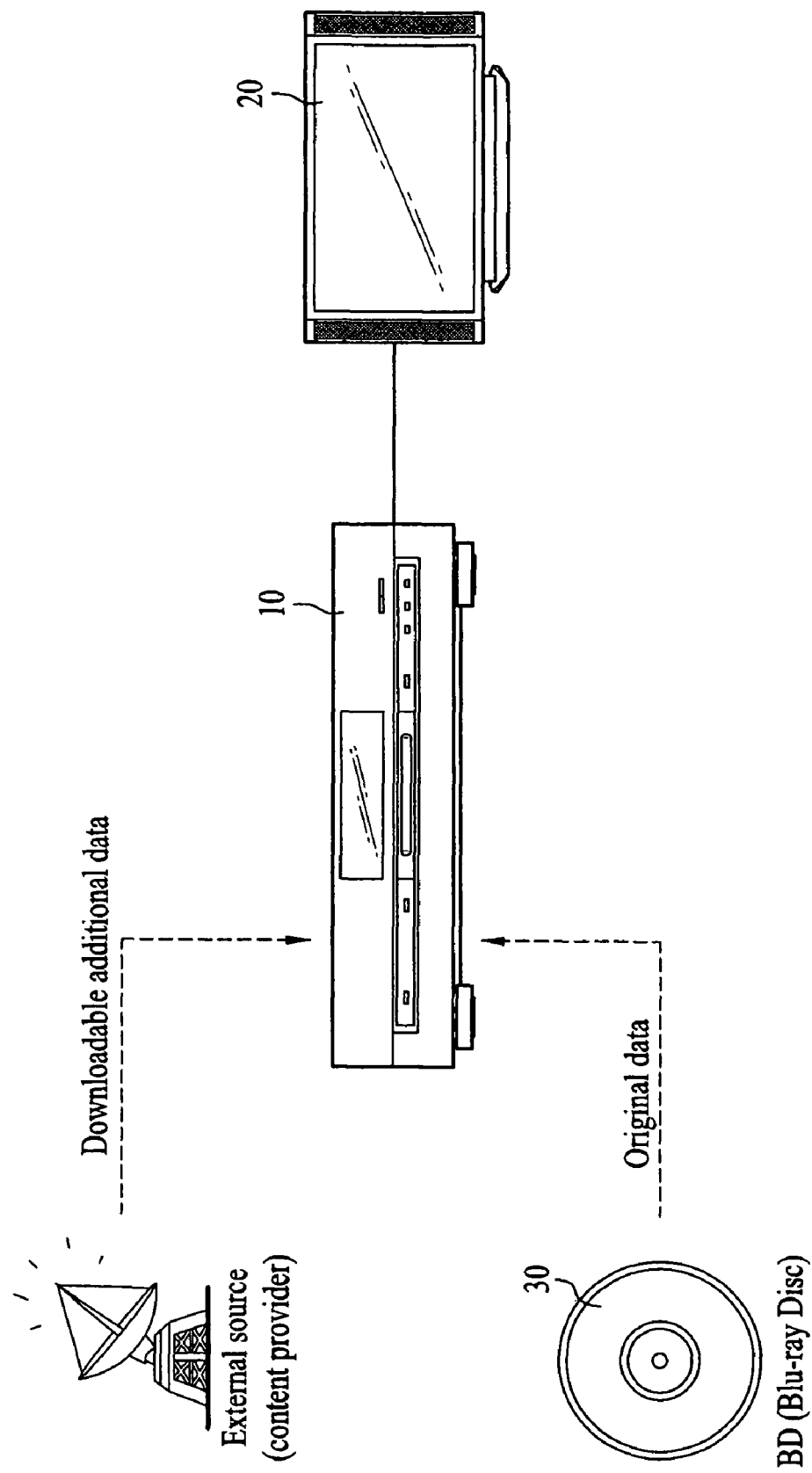
FIG. 1 is a diagram for facilitating a conceptional understanding of the present invention.

In the present invention, "local storage" is a sort of a storage means provided within an optical recording/reproducing device shown in FIG. 1 and means an element in which a user can randomly store necessary information and data to utilize. In particular, the local storage, which is currently used in general, includes "hard disc", "system memory", "flash memory" or the like, which does not put limitation on the scope of the present invention.

Specifically, the "local storage" is utilized as a means for storing data associated with a recording medium (e.g., Blu-ray disc). The data associated with the recording medium to be stored within the local storage generally includes data downloaded from outside.

Besides, it is apparent that a permitted data directly read out of a recording medium in part or a generated system data (e.g., metadata, etc.) associated with recording/reproduction of the recording medium can be stored within the local storage.

For convenience of explanation of the present invention, the data recorded within the recording medium shall be named "original data" and the data associated with the recording medium among the data stored within the local storage shall be named "additional data".

In the present invention, "title" is a reproduction unit configuring an interface with a user. Each title is linked to a specific Object. And, a stream associated with the corresponding title recorded on a disc is reproduced according to a command or program within the Object. In particular, for explanation convenience of the present invention, a title having moving picture, movie and interactive information according to MPEG2 compression among titles recorded on a disc shall be named "HDMV Title". And, a title having moving picture, movie and interactive information executed by a Java program among titles recorded on a disc shall be named "BD-J Title".

FIG. 1 is a diagram for facilitating a conceptional understanding of the present invention, in which a unified use between an optical recording/reproducing device 10 and peripheral devices is exemplarily shown.

Referring to FIG. 1, "optical recording/reproducing device" 10 according to the present invention enables a record or playback of an optical disc according to versatile specifications. And, the optical recording/reproducing device 10 can be designed to record/reproduce an optical disc (e.g., BD) of a specific specification. Moreover, the optical recording/reproducing device 10 can be made to reproduce an optical disc only. In the following description of the present invention, by considering interactivity between a Blu-ray disc (BD) and a peripheral device, a BD-player or a BD-recorder will be taken as an example. And, it is apparent that the "optical recording/reproducing device" 10 includes "drive" loadable within a computer or the like.

The optical recording/reproducing device 10 according to the present invention is equipped with a function of recording/playing an optical disc 30 and a function of receiving an external input signal, performing signal-processing on the received signal, and delivering a corresponding image to a user via another external display 20. In this case, no limitation is put on the external input signal. And, a DMB (digital multimedia broadcast) signal, an Internet signal or the like can be a representative one of the external input signals. In case of Internet as an easily accessible medium, a specific data on Internet can be downloaded via the optical recording/reproducing device 10 to be utilized.

Besides, a party, who provides contents, as an external source is generically named "content provider (CP)".

In the present invention, contents, which configure a title, mean data provided by a recording medium author.

Specifically, the object of the present invention is to decrypt encrypted data using a key in case that original data within the optical recording/reproducing device 10 and/or additional data, which is associated with the original data and exists on Internet or the like outside the optical recording/reproducing device 10, are encrypted. Encryption and decryption using the key will be explained with reference to FIG. 7 later.

The original data and the additional data will be explained in detail as follows. For instance, if a multiplexed AV stream for a specific title is recorded as an original data recorded within an optical disc and if an audio stream (e.g., English) different from the audio stream (e.g., Korean) of the original data is provided as an additional data on Internet, a request for downloading the audio stream (e.g., English) as the additional data on Internet to reproduce together with the AV stream of the original data or a request for downloading the audio stream (e.g., English) as the additional data on Internet to reproduce only will exist according to a user. To enable the requests, association between the original data and the additional data needs to be regulated and a systematic method of managing/reproducing the data according to the user's request is needed.

For convenience of explanation in the above description, a signal recorded on a disc is named original data and a signal existing outside the disc is named additional data, which is identified according to a method of acquiring each data but does not put limitation on restricting the original or additional data to a specific data.

Hence, the additional data generally includes audio, presentation graphic (PG), interactive graphic (IG), text subtitle or the like, on which limitation is not put. And, the additional data can correspond to a multiplexed AV stream including all of the illustrated data and video. Namely, data having any kind of attribute, which exists outside the optical disc and is associated with the original data, can become the additional data.

Moreover, the additional data can be individually downloaded per index file (index), PlayList file (*.m2ts) or clip information file (*.clpi). Besides, the additional data can be downloaded by contents unit or by title unit.

To realize the user's requests, it is essential to provide a file structure between the original data and the additional data. File and data record structures usable for a Blu-ray disc (BD) are explained in detail with reference to FIG. 2 and FIG. 3 as follows.

Figure 2:
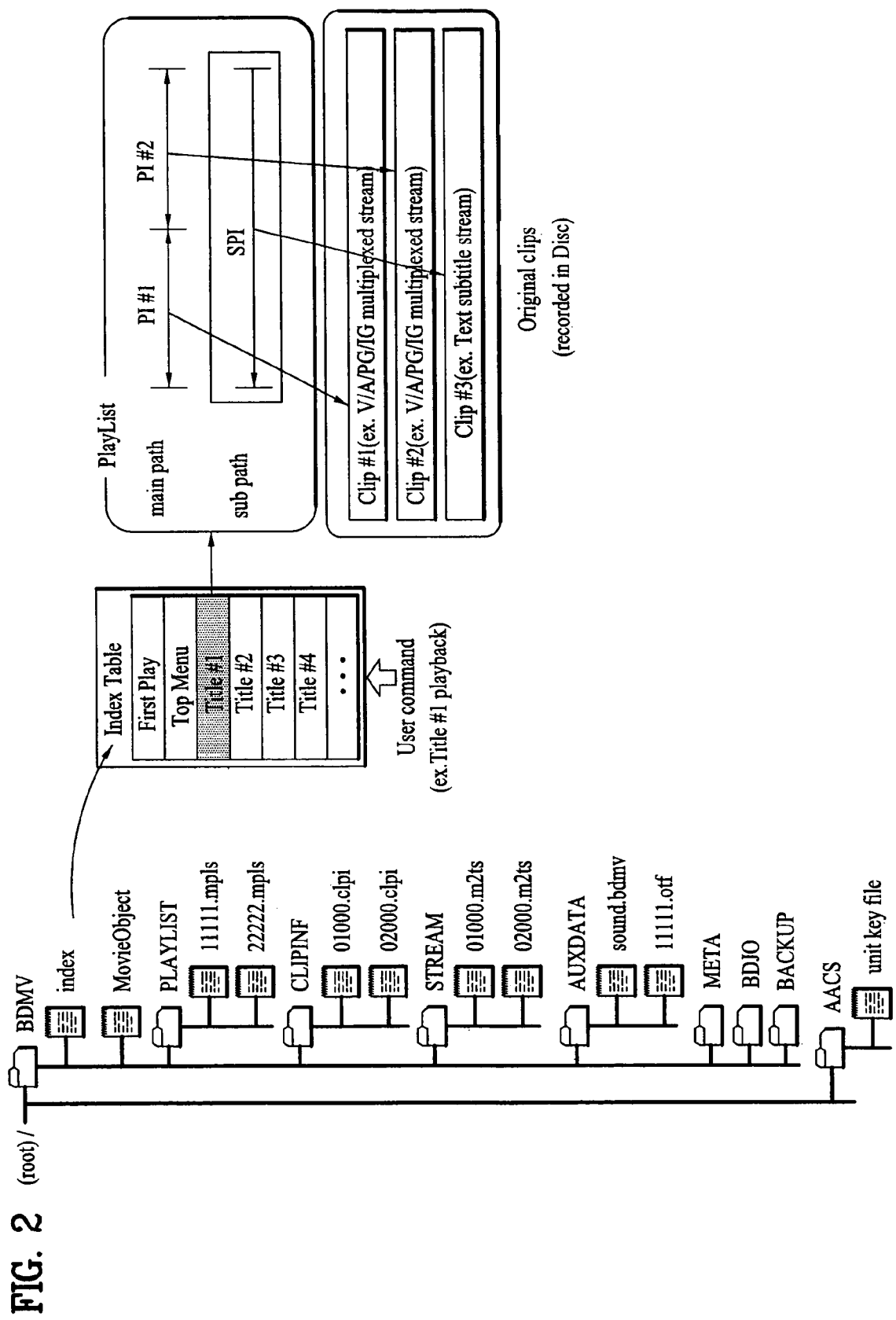
FIG. 2 is a diagram of a file structure recorded within an optical disc as a recording medium according to the present invention and a relation in reproducing a specific title using the file structure.

FIG. 2 is a diagram of a file structure recorded within an optical disc as a recording medium according to the present invention and a relation in reproducing a specific title using the file structure.

Referring to FIG. 2, in a file structure according to the present invention, an AACS directory (AACS) and at least one BDMV directory exist below one root directory. An index file ("index") and an Object file ("MovieObject") as general file (higher file) information to secure interactivity with a user exist within the BDMV directory. And, the BDMV directory, which has information of data actually recorded on a disc and information about a method of reproducing the recorded data, is provided with PLAYLIST directory, CLIPINF directory, STREAM directory, AUXDATA directory, BDJO directory, META directory and BACKUP directory. The directories and files included in each of the directories are explained in detail as follows.

META directory includes a metadata file as data about a data. Namely, in the META directory, a search file, a metadata file for Disc Library and the like exits.

BDJO directory includes a BD-J Object file for reproducing a BD-J Title.

AUXDATA directory includes auxiliary files containing information required for a disc playback. For instance, AUXDATA directory can include a sound file ("Sound.bdmv") providing click sound in case of an execution of interactive graphic and a font file ("1111.otf") providing font information in case of a disc playback.

In STREAM directory, AV stream files recorded on a disc in a specific format exist, each of the streams is recorded as MPEG-2 transport packets in general, and ".m2ts" is used as an extension of a stream file (01000.m2ts, . . . ). In particular, a stream generated from multiplexing video, video and graphic information together is named an A/V stream and at least one or more A/V stream files construct a title.

CLIPINF directory includes clip information files (01000.clpi, 02000.clpi) according to one-to-one correspondence to the stream files, respectively. In particular, the clip information file ("*.clpi") includes attribute information and timing information of the corresponding stream file. In particular, the stream file ("*.m2ts") and the clip information file ("*.clpi") corresponding to the stream file (*.m2ts) by one-to-one are bound together to be named "clip". Namely, "clip" is the data containing both of the stream file ("*.m2ts") and the clip information file ("*.clpi").

PLAYLIST directory includes PlayList files ("*00000.mpls"). Each of the PlayList files ("*00000.mpls") includes at least one PlayItem (PI) and SubPlayItem (SPI) designating a playing interval of reproducing a specific clip. The PlayItem and SubPlayItem (SPI) have information about a reproduction start time (IN-Time) and reproduction end time (OUT-Time) of a specific clip.

A reproduction process within PlayList file by at least one PlayItem (PI) is called "main path" and a reproduction process within PlayList file by each SubPlayItem (SPI) is called "sub path". The main path should exist within the PlayList file and at least one sub path may exist according to a presence of SubPlayItem (SPI) if necessary.

Namely, the PlayList file becomes a basic reproduction management file unit within an entire reproduction management file structure, which performs a reproduction of a specific clip by a combination of at least one or more PlayItems.

BACKUP directory stores all copy files of index file ("index") recording information associated with a disc playback among data of the file structure, Object files (MovieObject, BD-J Object), all PlayList files ("*.mpls") within PLAYLIS directory, and all clip information files ("*.clpi") within CLIPINF directory. Since the loss of the files is fatal to the disc playback, the BACKUP directory stores these files for backup.

In the AACS directory, a unit key file exists. And, encryption information for the data encrypted with a key exists in the unit key file.

Another diagram of FIG. 2 shows a relation that a specific title is reproduced by the aforesaid disc package.

If a user's title reproducing command for a title provided by an index file, which is called an index table as well, is given, a reproduction of the corresponding title will begin, which is explained in detail as follows.

First of all, "First play" information having information about a firstly reproduced image in case of a loading of a corresponding disc, "Top Menu" information providing a menu image, and at least one "Title (Title #1~Title #n)" information are configured within the index table (index.bdmv).

Once an optical disc 30 is loaded in an optical recording/reproducing device 10, the title menu information by the index table is provided to a user via a display 20. If the user selects a specific title or a specific menu within the menu image, a reproduction starts according to a file structure previously defined by a disc author. Namely, if a reproduction command for a specific title (e.g., Title #1) is given, a corresponding PlayList file is executed according to a command or program provided within an object file (Movie Object, BD-J Object) on a reproduction management file structure. At least one or more clips (e.g., Clip #1~Clip #3) constructing the Title #1 are then reproduced by a specific PlayItem and/or SubPlayItem according to PlayList file information.

In case that "First play", "Top Menu" or "Title" is encrypted, data, which will reproduced by "First play", "Top Menu" or "Title", needs to be decrypted for the reproduction. If a reproduction command for one of "First play", "Top Menu" and "Title" is given, a key corresponding to a unit key file within AACS directory (AACS) is read out. And, data is decrypted using the read-out key. The decrypted data is then reproduced.

Figure 3:
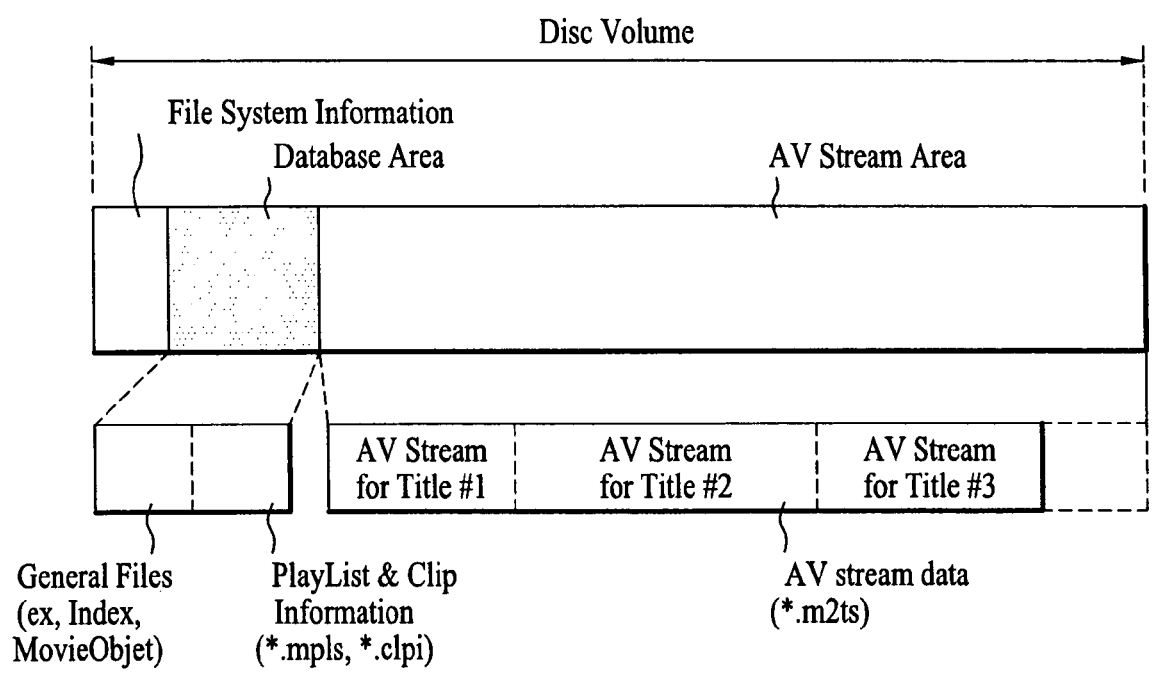
FIG. 3 is a diagram of a data record structure written on an optical disc as a recording medium according to the present invention.

FIG. 3 is a diagram of a data record structure written on an optical disc as a recording medium according to the present invention.

Referring to FIG. 3, in view from an inner circumference of a disc, there exist a file system information area as system information for managing an entire file, an area ("database area") in which PlayList and clip information files are written to reproduce a recorded AV stream (*.m2ts), and an AV stream area in which a stream configured with audio/video/graphic and the like is recorded. As mentioned in the foregoing description, in the present invention, the data recorded in the AV stream area is named original data.

In case that original data recorded within the disc and/or additional data stored within a local storage are encrypted, the present invention intends to provide an apparatus and method for reproducing a recording medium using the local storage in a manner of decrypting the encrypted data.

FIG. 4A is a block diagram of an optical recording/reproducing device 10 according to one embodiment of the present invention.

Referring to FIG. 4A, an optical recording/reproducing device 10 according to one embodiment of the present invention basically includes a pickup 11 for reproducing management information including original data and reproduction management file information recorded in an optical disc, a servo 14 controlling an action of the pickup 11, a signal processor 13 restoring a reproduction signal received from the pickup 11 to a specific signal value, the signal processor 13 modulating a signal to be recorded into a signal recordable on the optical disc, the signal processor 13 delivering the modulated signal, and a microprocessor 16 controlling the overall operations.

Additional data existing on a place except an optical disc is downloaded to a local storage by a controller 12. The controller 12 generates a binding unit using information recorded in a binding unit manifest file within the local storage 15. The controller 12 constructs a virtual package to reproduce recording medium data and data within the local storage 15 using name mapping information recorded in the binding unit manifest file within the local storage 15. The controller 12 reproduces original data and/or additional data according to a user's request by utilizing the constructed virtual package. The binding unit manifest file, name mapping information and virtual package will be explained in detail with reference to FIG. 5 later.

The newly generated virtual package can be stored in the local storage 15 for later reuse or temporarily stored in a separate dynamic memory to be utilized.

In case that the original data and/or additional data is encrypted, the controller 12 reads a key to be used for encryption of the data from a unit key file, decrypts the encrypted data, and then provides the decrypted data to a decoder.

A playback system 17 finally decodes output data to provide to a user under the control of the controller 12. The playback system 17 includes a decoder decoding an AV signal and a player model deciding a reproduction direction by analyzing an object command or application associated with the aforesaid reproduction of a specific title and a user command inputted via the controller 12. And, the playback system 17 will be explained in detail in the description of FIG. 4B.

In order to perform a function of recording a signal in the optical disc, an AV encoder 18 converts an input signal to a signal of a specific format, e.g., an MPEG2 transport stream according to a control of the controller 12 and then provides the converted signal to the signal processor 13.

Figure 4B:
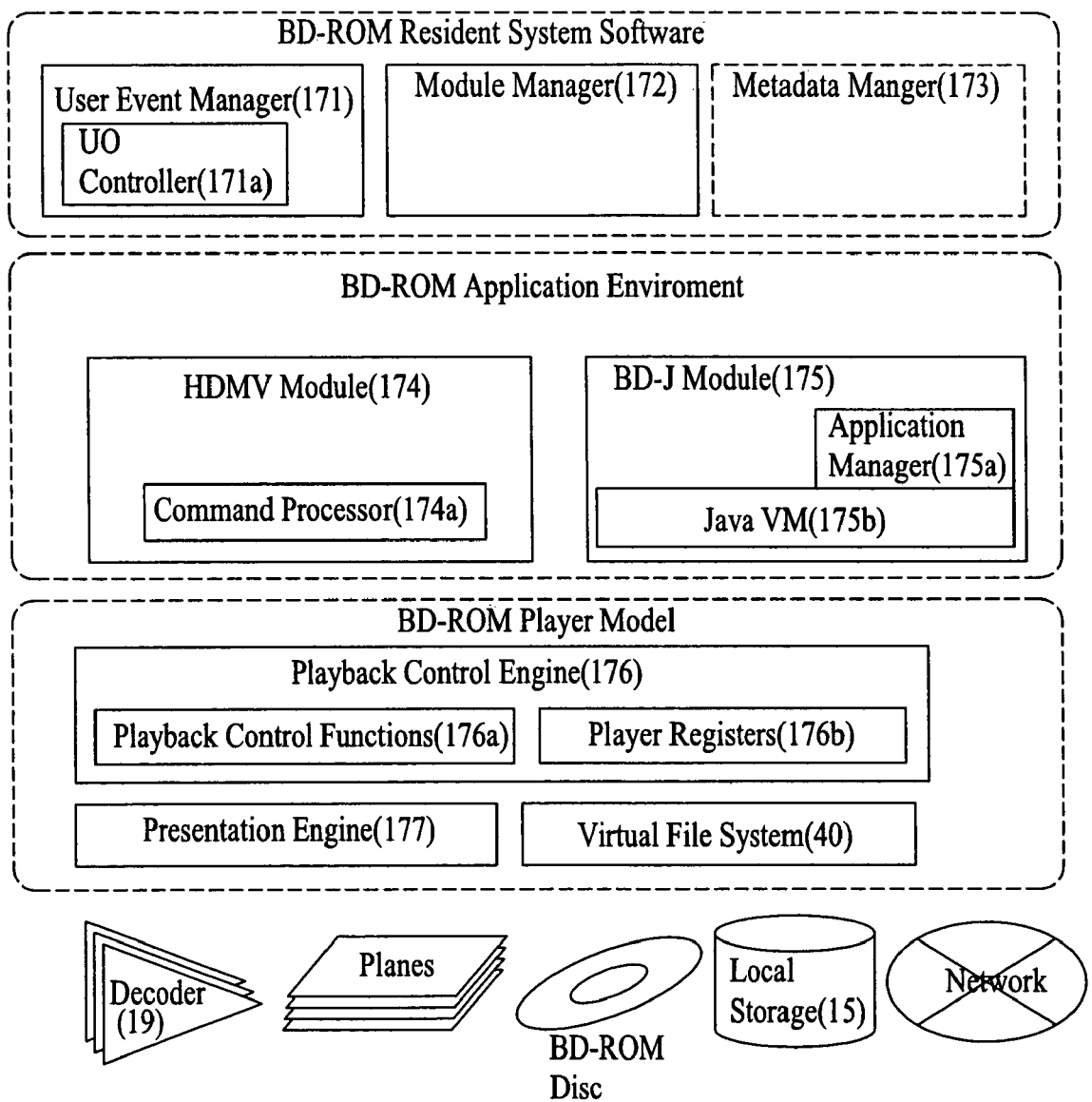
FIG. 4B is a block diagram of an optical recording/reproducing device using a playback system according to the present invention.

FIG. 4B is a block diagram of a recording medium reproduction apparatus utilizing a playback system according to the present invention.

Referring to FIG. 4B, first of all, "playback system" includes a collective reproduction processing means constructed with a program (software) and/or hardware provided within the optical recording/reproducing device. The playback system plays a recording medium loaded in the optical recording/reproducing device and simultaneously reproduces and manages the data that is associated with the recording medium and is stored in the local storage (e.g., data downloaded from outside).

In particular, a playback system 17 includes "User Event Manager (171)", "Module Manager(172)", "HDMV Module(174)", "BD-J Module(175)", "Playback control engine(176)", "Presentation engine(177)" and "Virtual File System(40)", which is explained in detail as follows.

First of all, as separate reproduction processing management means for reproducing HDMV Title and BD-J Title, respectively, "HDMV Module (174)" for HDMV Title and "BD-J Module (175)" for BD-J Title are independently configured. Each of the "HDMV Module (174)" and the "BD-J Module (175)" has a control function of receiving to process a command or program within the aforesaid object (Movie Object or BD-J Object).

As a means for receiving to process the command and the like, "Command processor (174a)" is provided within the "HDMV Module (174)" and "Java VM (175b)" and "Application manager (175a)" are provided with the "BD-J Module (175)".

Moreover, "Module Manager (172)" is provided to deliver a user command to the "HDMV Module (174)" or the "BD-J Module (175)" and to control an operation of the "HDMV Module (174)" or the "BD-J Module (175)". And, "Playback control Engine (176)", which interprets PlayList file information recorded on a disc according to a reproduction command of the "HDMV Module (174)" or the "BD-J Module (175)" and performs a corresponding reproduction function, is provided. Moreover, "Presentation Engine (177)" for decoding a specific stream reproduced and managed by the "Playback Control Engine (176)" and displaying the decoded stream on a screen is provided.

Specifically, the "Playback Control Engine (176)" includes "Playback Control functions (176a)" actually managing all reproductions and "Player Registers (176b)" storing player status registers (PSR) and general purpose register (GPR). In some cases, "Playback Control functions (176a)" may mean "Playback Control Engine (176)".

In the above-explained playback system of the present invention, the "Module Manager (172)", "HDMV Module (174)", "BD-J Module (175)" and "Playback Control Engine (176)" can be processed by software, respectively. Substantially, software is more advantageous than a hardware configuration in design. Yet, the "Presentation Engine (177)", decoder and plane are normally designed by hardware. In particular, the elements (e.g., reference numbers 172, 174, 175, 176) processed by software can be configured with a portion of the controller 12. Hence, the configuration of the present invention should be understood by its meaning but is not limited to a hardware configuration or a software configuration.

The playback system 17 according to the present invention has the following features.

First of all, "HDMV Module (174)" for HDMV Title and "BD-J Module (175)" for BD-J Title are independently configured. And, both of the modules 174 and 175 are not simultaneously executed. Namely, BD-J Title cannot be reproduced while HDMV Title is being reproduced, and vice versa.

Secondly, BD-J application, which is a program of managing a network function within an optical recording/reproducing device like the operation of downloading additional data from outside and a local storage 15 like an operation of constructing a virtual package by editing files stored in the local storage 15 or by binding the files to a disc package, is provided within the playback system 17. Namely, the BD-J application configures a virtual file system 40 managing a file system within a disc and a local storage file system as one system and constructs and manages a virtual package for reproducing original data and additional data via the configured virtual file system 40. And, a method of constructing a virtual package via the virtual file system 40 will be explained with reference to FIG. 5 later.

Thirdly, HDMV Title and BD-J Title receive user commands of separate types, respectively and execute user commands independent from each other, respectively. Yet, a means for receiving to transfer a user command to "HDMV Module (174)" or "BD-J Module (175)" is required, which is taken charge of by "User Event Manager (171)". Hence, for example, if a received command is a user command by "User Operation (UO)", "User Event Manager (171a)" transfers it to "Module Manager (172)" or "UO Controller (171a)" so that "Module Manager (172)" or "UO Controller (171a)" can execute the command. If a received command is a user command by "Key Event", "User Event Manager (171a)" transfers it to "Java. VM (175b)" within "BD-J Module (175)" so that "Java VM (175b)" can execute the command.

Fourthly, a management of the aforesaid "Playback control Engine (176)", which can be called "master", is taken charge of by one of the currently operating modules 174 and 175. Namely, "HDMV Module (174)" becomes a master while HDMV title is being reproduced. "BD-J Module (175)" becomes a master while BD-J title is being reproduced.

Besides, the "playback system" can include "Metadata Manager (173)". And, "Metadata Manager (173)" provides Disc Library and Enhanced Search Metadata application to a user.

Figure 5:
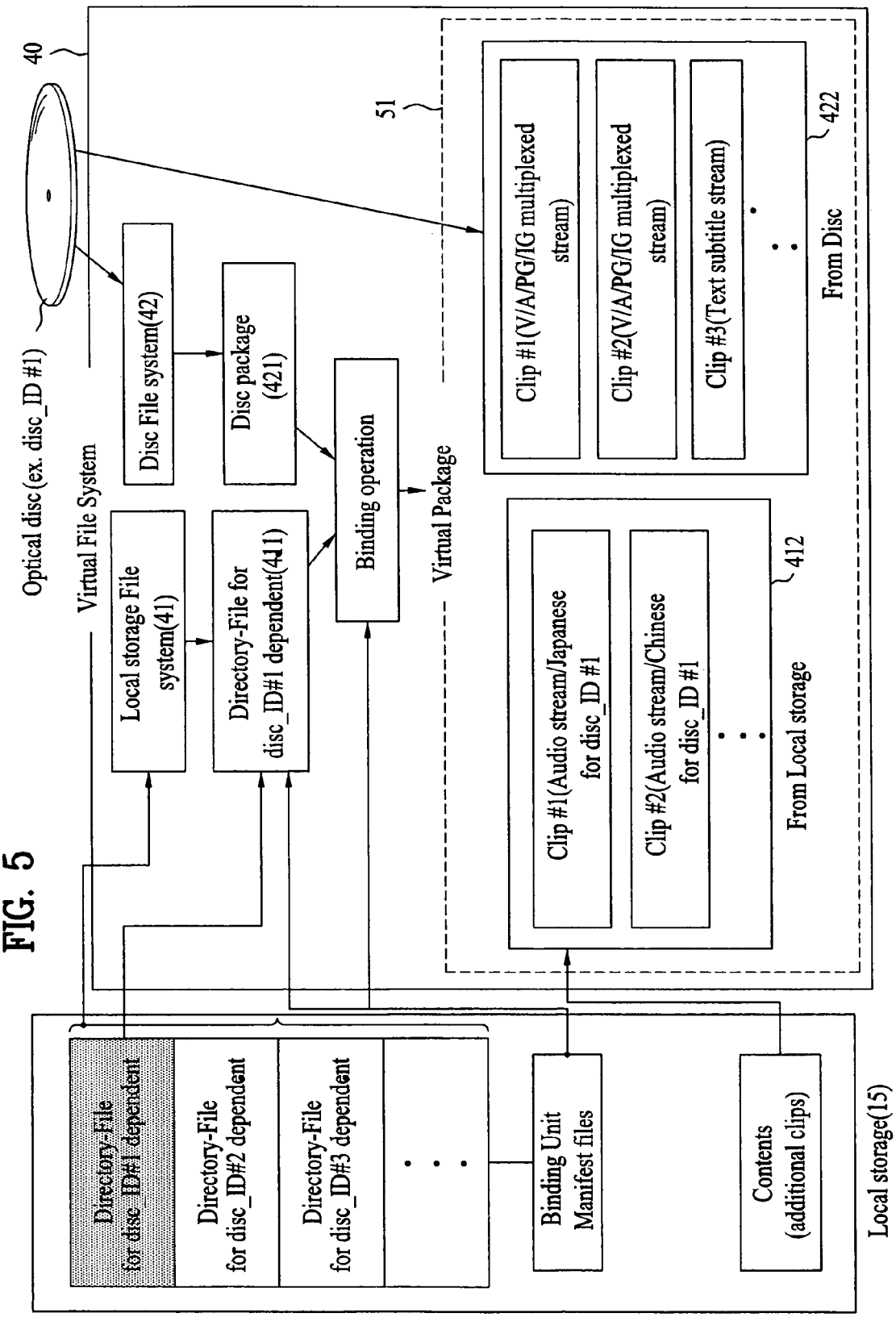
FIG. 5 is a diagram for a concept of a method of constructing a virtual package according to the present invention.

FIG. 5 is a diagram for a concept of a method of constructing a virtual package according to the present invention.

Referring to FIG. 5, if a specific disc is loaded while the information and contents, as shown in FIG. 4B, are stored within a local storage 15, an optical recording/reproducing device 10 reads out file system information 41 within the local storage 15 and disc file system information 42 including a file structure recorded within the disc and then configures a virtual file system (VFS) using the read-out information. In particular, the virtual file system (VFS) means a sort of a virtual system that is virtually configured to unify and manage a file system within the local storage 15 and a file system of the loaded disc.

To reproduce both of the original data within the disc and the additional data within the local storage through the virtual file system in the present invention, a new virtual package is constructed. For this, a binding unit is generated according to information within a binding unit manifest file from file information (Directory-File for disc_ID #1 dependent) associated with the loaded disc (e.g., disc_ID #1) within the file system of the local storage 15. A binding operation of reading out the generated binding unit to replace or to be appended to a file structure of the loaded disc (disc_ID #1) according to name mapping information recorded in the binding unit manifest file is then carried out.

In the present invention, the name mapping information is the information recorded in the binding unit manifest file in file structure of the local storage. And, the name mapping information is applied to a case of generating the binding unit or to a case of constructing the virtual package through the binding operation.

Files and title relation list, Progressive PlayList information or Credential information is the information that can be included in the binding unit manifest file. The files and title relation list us used for deletion and verification of Title unit. The Credential information is used in binding a file of another content provider (CP).

Besides, the binding unit has a structure basically similar to that of a disc package that is the file structure of the recording medium. Yet, the binding unit itself is unable to operate as a reproduction management file. This corresponds to the difference between the file structure of the binding unit and the file structure within the disc (i.e., disc package). If it is defined that the binding unit can perform the reproduction by itself, it is none other than the reproduction off data within the local storage. Hence, it is against the purpose of the present invention intending to reproduce the original data recorded within the disc together with the additional data.

And, the virtual package constructed through the binding operation has a file structure for management of an original clip constructed with the original data stored in different areas within the disc and an additional clip 412 constructed with the additional data within the local storage.

Figure 6:
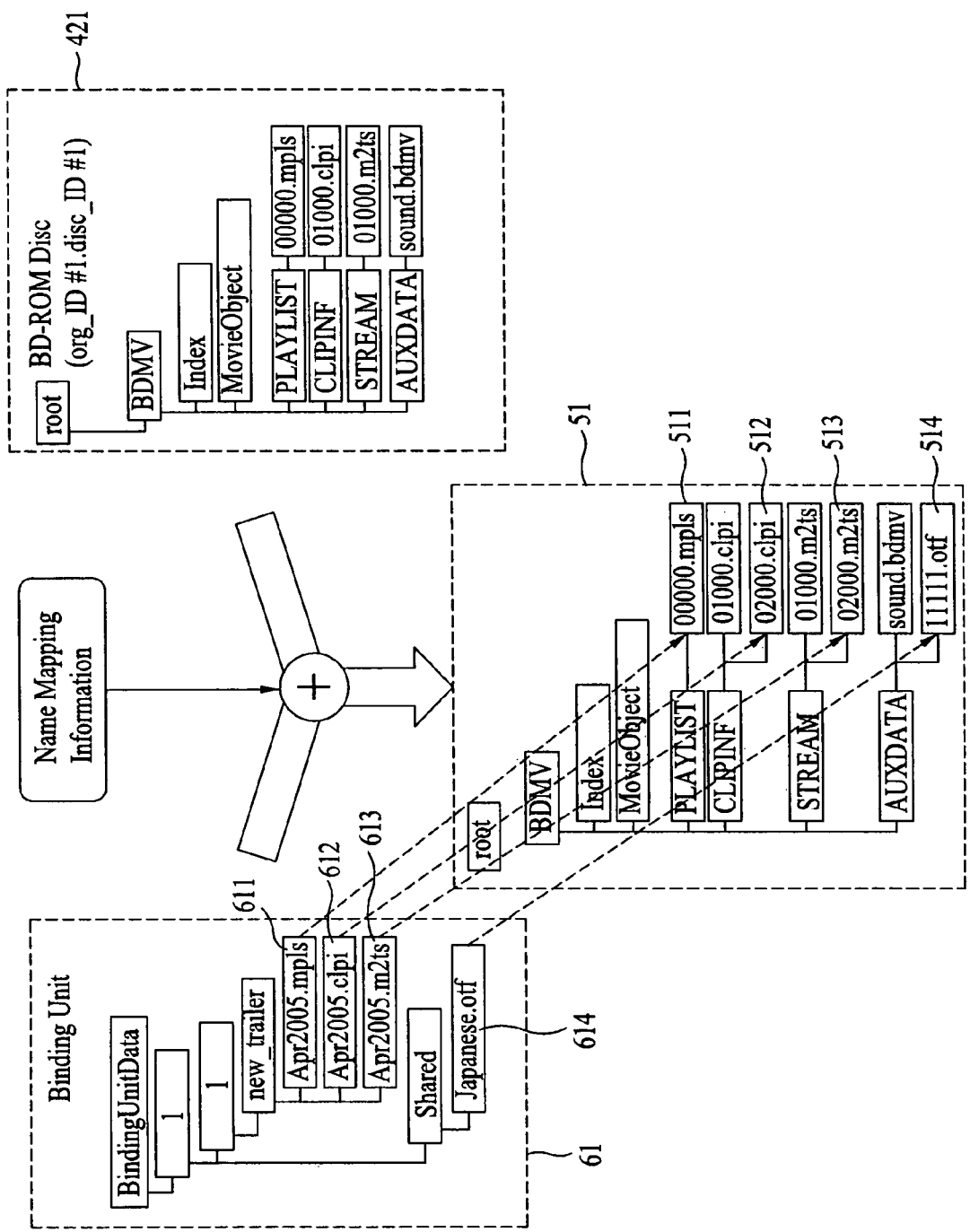
FIG. 6 is a diagram for explaining a relation in constructing a virtual package according to the present invention.

FIG. 6 is a diagram for explaining a relation in constructing a virtual package according to the present invention.

First of all, a specific file structure (e.g., the structure shown in FIG. 2) exists within a loaded disc, which is called a disc package in particular. A local storage file system 41 exists within a local storage. And, a binding unit and binding unit manifest file bound to the loaded disc (e.g., disc_ID #1) are included in the corresponding file system 41.

Besides, the binding unit manifest file contains name mapping information. And, the name mapping information is the information about the binding unit. For instance, the name mapping information includes information about a list of files generating the binding unit, file locations and file names within a virtual package and the like. Hence, the virtual file system (VFS) constructs a new virtual package through a binding operation by utilizing the name mapping information. Explanation is made with reference to FIG. 6 as follows.

In a disc package 421, a BDMV directory as a lower directory below a root directory includes an index file (Index.bdmv), an object file (MovieObject.bdmv), a PlayList file (00000.mpls), a clip information file (01000.clpi), a stream file (01000.m2ts) and an auxiliary data file (sound.bdmv). A binding unit 61 associated with a loaded disc (e.g., disc of "org_ID #1" and "disc_ID #1") includes a specific PlayList file (Apr2005.mpls) 611, a clip information file (Apr2005.clpi) 612, i.e., a clip managed by the PlayList file (Apr2005.mpls) 611, a stream file (Apr2005.m2ts) 613, and an auxiliary data file (japanese.otf) 614 in a disc-dependent shared directory (Shared). A method of constructing a virtual package 51 by binding the binding unit to the disc package is explained as follows.

According to name mapping information, the PlayList file (Apr2005.mpls) 611, clip information file (Apr2005.clpi) 612, stream file (Apr2005.m2ts) 613 and auxiliary data file (japanese.otf) 614 within the binding unit are changed in file names into a PlayList file (00000.mpls) 511 of a PlayList directory, a clip information file (02000.clpi) 512 of a CLIP-INF directory, a stream file (02000.m2ts) 513 of a STREAM directory, and an auxiliary data file (11111.otf) of an AUX-DATA directory in a virtual package 51, respectively.

Hence, the virtual package 51 includes an index file (Index) according to the virtual package and a MovieObject file in the BDMV directory as the lower directory below the root directory. PlayList file (00000.mpls) 511 replaced by the PlayList file of the binding unit is placed in PLAYLIST directory. In CLIPINF directory, the clip information file (02000.clpi) 512 of the binding unit is appended to the clip information file (01000.clpi) of a recording medium. In STREAM directory, the stream file (02000.m2ts) 513 of the binding unit is appended to a stream file (01000.m2ts) of a recording medium. In AUXDATA directory, the auxiliary data file (11111.otf) 514 of the binding unit is appended to an auxiliary data file (sound.bdmv) of a recording medium. Thus, the virtual package 51 is constructed.

Besides, the index file (Index) and the MovieObject file as upper files within the virtual package can be updated via an index table and a MovieObject file within a previous disc based on a newly generated PlayList file (00000.mpls) 511. In particular, the index file and the MovieObject file are updated in case that a title is changed by the PlayList file (00000.mpls) 511 within the virtual package. In this case, the title change means a new title addition, a previous title deletion, a scenario change of title playback or the like for example.

The index table within the virtual package plays a role as a sort of management information to reproduce a result of binding the downloaded data within the local storage and the data recorded within the disc together.

Meanwhile, the index table within the virtual package is generally generated by an external content provider and is then provided to a user to enable the downloaded data within the local storage to be reproduced together with the data recorded within the disc. Yet, the index table can be generated by a player based on the file structure within the virtual package.

In the present invention, in case that an indexing item of the index table within the virtual package is encrypted, the indexing item is decrypted using a key existing within a key file. The decrypted item is then reproduced. In doing so, the indexing item of index table within the virtual package and an indexing item of the key file may be mismatched. If the indexing items are mismatched, there rises a problem in reading out a proper key.

So, the present invention is intended to solve the mismatch problem in a manner of providing information. The information can be placed in a database file such as an index table and the like. The database file is a management file associated with a reproduction of data and includes index file, PlayList file, clip information file or the like. The information for solving the mismatch of the indexing items can be configured with a separate file as well. And, the information for solving the mismatch of the indexing items will be explained in detail with reference to FIGS. 9A to 11 later.

Figure 7:
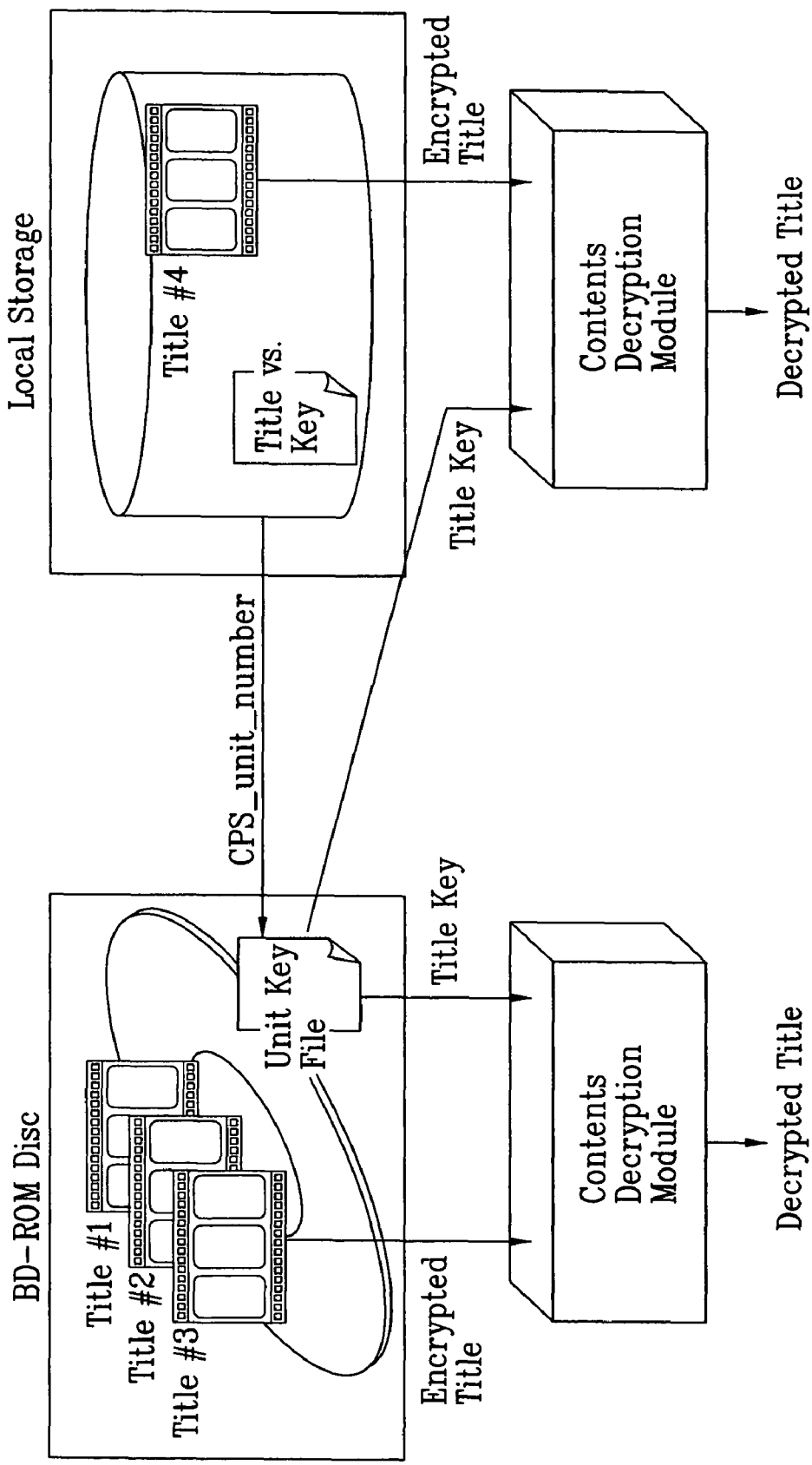
FIG. 7 is a diagram for facilitating a conceptional understanding of encryption/decryption of data according to the present invention.

FIG. 7 is a diagram for facilitating a conceptional understanding of encryption/decryption of data according to the present invention.

Referring to FIG. 7, encryption is a sort of a content protecting method of preventing illegal copy redistribution, editing and the like of contents provided by a content provider (CP) in a manner of transforming data using a specific algorithm. Hence, the encryption of data plays a role as a sort of a lock that prevents an unauthorized access to the data and the specific algorithm plays a role as a key for the lock. Hereinafter, the specific algorithm used for the encryption of data is called an encryption key.

A means for interpreting the specific algorithm used for the encryption should be provided to reproduce the encrypted data. The specific algorithm interpreting means plays a role as a sort of a key for the lock. If the key is provided, the algorithm used for the data encryption is interpreted using the key and the data is recovered to its original format. Such a data recovery is called a decryption.

In the present invention, the algorithm used for the encryption and decryption of data is named a key. The encryption of data can be executed per such a predetermined unit as a contents unit, a title unit and the like. And, a key used in encrypting data per the predetermined unit shall be named "Unit Key".

In the present invention, "CPS (content protection system) unit" means a group of "First play", "Top Menu" and/or "title" that are encrypted using the same "Unit Key". And, each "CPS Unit" has "CPS_unit_number".

For instance, all AV stream files reproduced by "First Play" use the same "Unit Key" to be included in the same "CPS Unit". All AV stream files reproduced by "Top Menu" are encrypted using the same "Unit Key" to be included in the same "CPS Unit". And, all AV stream files reproduced by one Title are encrypted using the same "Unit Key" to correspond to the same "CPS Unit".

In particular, in FIG. 7, Title #1, Title #2 and Title #3 are recorded in a BD-ROM disc as a recording medium. And, Title #4 downloaded from outside of the recording medium exists in a local storage. Data configuring the titles (Titles #1 to #4) are encrypted data, and information about a key used for encryption of the data exists as a unit key file within the disc. The unit key file preferably exists within the disc to prevent information leakage caused by hacking and the like.

Yet, if "Unit Key" for "CPS Unit" to which the Title belongs does not exist within the disc, the "Unit Key" is downloadable.

In case that a user selects Title #3 recorded within the disc to reproduce, a key used in decrypting the Title #3 (hereinafter called a decryption key) should be provided to Contents Decryption Module to reproduce the Title #3.

Once the decryption key of Title #3 is provided, the contents decryption module decrypts the Title #3 into the data form before the encryption using the provided key. So, the decrypted data is reproduced via a decoder 17.

Title #4 is a title including the downloaded data within a local storage. If a user gives a command for a reproduction of Title #4, a decryption key of the Title #4 is read out of the unit key file. The read-out key is provided to the contents decryption module together with Title #4 to decrypt the Title #4.

Figure 8A:
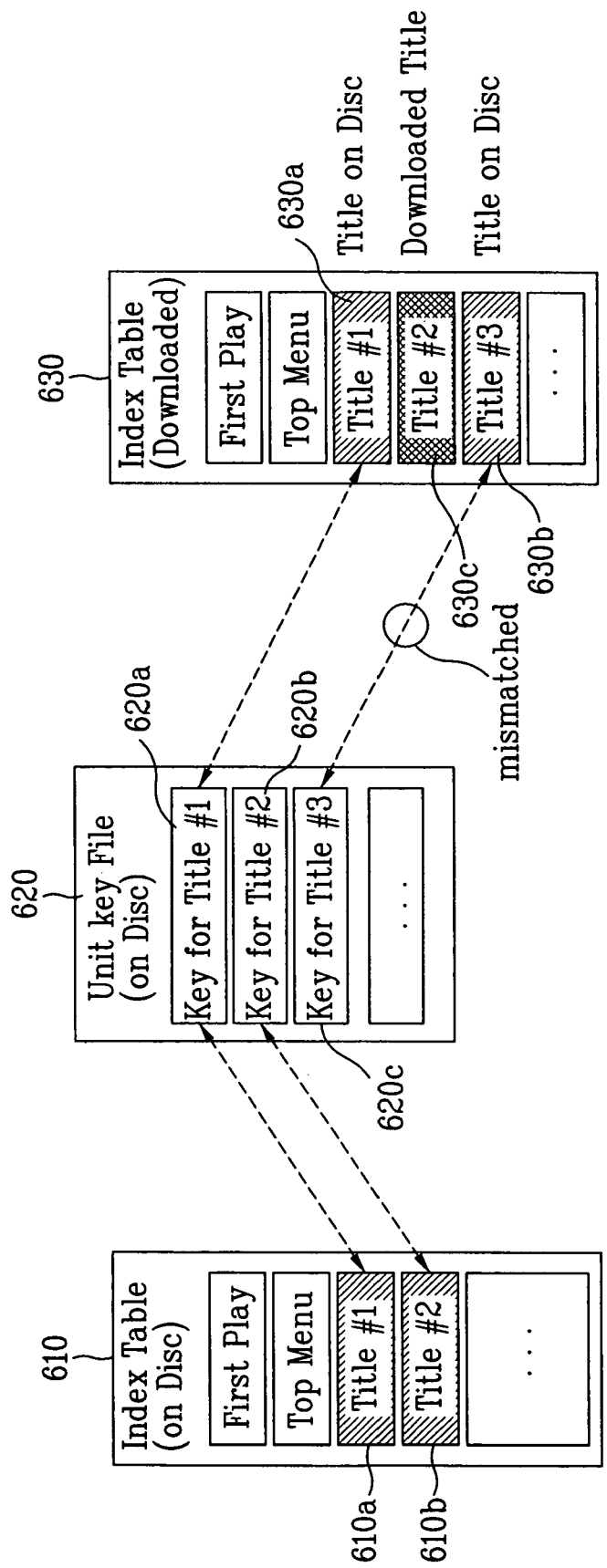

FIG. 8A and FIG. 8B are diagrams for explaining error generated in the process of decrypting indexing items of an index table capable of reproducing downloaded data.

First of all, an indexing item means "First Play", "Top Menu", "Title" or the like, which constructs an index table. The indexing item is linked to a specific object and then reproduces a stream associated with the corresponding indexing item, which is recorded on a disc or is stored in a local storage, thereby becoming a reproducing unit configuring an interface with a user.

FIG. 8A shows an example of a mismatch between an indexing item of index table within a virtual package and an indexing item of a unit key file, and FIG. 8B shows an example of a unit key file including "CPS_unit_number".

Referring to FIG. 8A, an index table 601 and a unit key file 620 including decryption keys of indexing items of the index table 610 are stored in a disc.

And, the keys of the unit key file 620 are defined with reference to data recorded within the disc. In particular, "Key for Title #1" 620 *a* is a decryption key of Title #1 610*a* recorded within the disc and "Key for Title #2" 620*b* is a decryption key of Title #2 610*b* recorded within the disc.

Once the disc is loaded, data associated with the disc is downloaded to a local storage. A virtual package 51 is then constructed by binding the downloaded data to a disc package 421. The virtual package 51 includes an index table 630 within an updated virtual package. The data recorded within the disc and the downloaded data are reproduced via the index table 630 within the virtual package.

Besides, the index table 630 within the virtual package can be generated in a manner of considering a result of binding the downloaded data to the previous index table 610 by a player or can be provided by an external content provider in a form that the data recorded within the disc and the downloaded data can be generated.

The index table 630 within the virtual package includes indexing items such as "First Play", "top Menu", Title #1, Title #2 and Title #3. Title #1 630*a* of the index table 630 within the virtual package corresponds to Title #1 610*a* recorded within the disc, Title #2 630*c* is Title including the downloaded data (hereinafter called a downloaded Title), and Title #3 630*b* corresponds to Title #2 610*b* recorded within the disc.

Once a reproducing command of Title #1 630*a* among the indexing items of the index table 630 within the virtual package is given, the decryption key of the Title #1 630*a* should be provided to a contents decryption module. Since the Title #1 630*a* is the same title of Title #1 610*a* recorded within the disc, the Title #1 630*a* can be decrypted using "Key for Title #1" 620*a*. Once the Title #1 630*a* is decrypted, it is decoded by a decoder 19 to be provided to a user.

Let's look into a case that a reproduction command for Title #3 630*b* among the indexing items is given. Title #3 630*b* corresponds to Title #2 610*b* recorded within the disc. So, "Key for Title #2" 620*b* is required for the decryption of the Title #3 630*b*. Yet, the Title #3 630*b* differs from the Title #2 610*b* in title number. In case that separate information doesn't exist within the virtual package, "Key for Title #3" 620*c* may be read out instead of "Key for Title #2" 620*b*. In such a case, Title #3 630*b* and "Key for Title #3" 630*c* are provided to the contents decryption module. Since "Key for title #3" 630*c* is not the decryption key of the Title #3 630*b*, the Title #3 cannot be decrypted.

Likewise, the downloaded Title #2 630*c* cannot be reproduced unless information for a decryption key of the downloaded Title 630*c* exists. Yet, if the downloaded Title #2 630*c* is not encrypted or is encrypted with the same key of Title #2 610*b* recorded within the disc, there will be no problem in reproducing the downloaded Title #2 630*c*.

Referring to FIG. 8B, "Unit Key" of a unit key file is defined with reference to "CPS Unit". "CPS_unit number" is given to each indexing item, and "Unit Key" is defined to each "CPS Unit". The "CPS_unit number" plays a role as a sort of link information for linking an encrypted data to a decryption key of the data.

Once a reproduction command for Title #1 610*a* is given via an index table 610 stored within a disc, a player confirms "CPS Unit", to which the Title #1 belongs, from "CPS_unit number" of the Title #1 in a unit key file and then reads out "Unit Key" for the "CPS Unit". The "CPS_unit number" for the Title #1 that is the title within the disc is "1", which means that the Title #1 belongs to "CPS Unit #1". Hence, "Unit Key for CPS Unit #1" is read out.

Likewise, if a reproduction command for Title #2 610*b* is given by the index table 610 stored within the disc, the player confirms that the Title #2 610*b* belongs to "CPS Unit #2" via "CPS_unit_number for Title #2" and then reads out "Unit Key for CPS Unit #2" to provide to the contents decryption module.

Title #1 and Title #2 recorded within the disc correspond to title #1 630*a* and title #3 630*b* in an index table 630 within a virtual package capable of reproducing a result of binding the data recorded within the disc and the downloaded data together, respectively. Since title #1 630*a* of the index table 630 within the virtual package is identical to Title #1 610*a* recorded within the disc, the Title #1 630*a* can be decrypted by "Unit Key for CPS Unit #1" within the unit key file.

Yet, in case of Title #3 630*b* of the index table 630 within the virtual package, if separate information is not given, the player may read out "Unit Key for CPS Unit #3" by confirming "CPS_unit_number for Title #3" from the unit key file. Since the Title #3 630*b* is identical to Title #2 recorded within the disc, the "Unit Key for CPS Unit #3" is not suitable for the decryption of the Title #3 630*b*. Therefore, a reproduction is not completed since the Title #3 630*b* is not recovered into a form decodable by a decoder.

In case of downloaded Title #2 630*c*, a title number used in giving "CPS_unit_number" in the unit key file does not coincide with a title number of the index table 630 within the virtual package unless the Title #2 630*c* is not encrypted or encrypted with the same key of the Title #2 610*b* recorded within the disc. Hence, a key unsuitable for the description of the Title #2 may be read out.

The present invention intends to prevent a decryption key from being incorrectly read out due to the mismatch between the indexing item used by the unit key file 620 and the indexing item of the index table within the virtual package. By solving the mismatch problem, the decryption of the encrypted data can be smoothly carried out in reproducing the downloaded data and the data recorded within the disc.

Figure 9B:
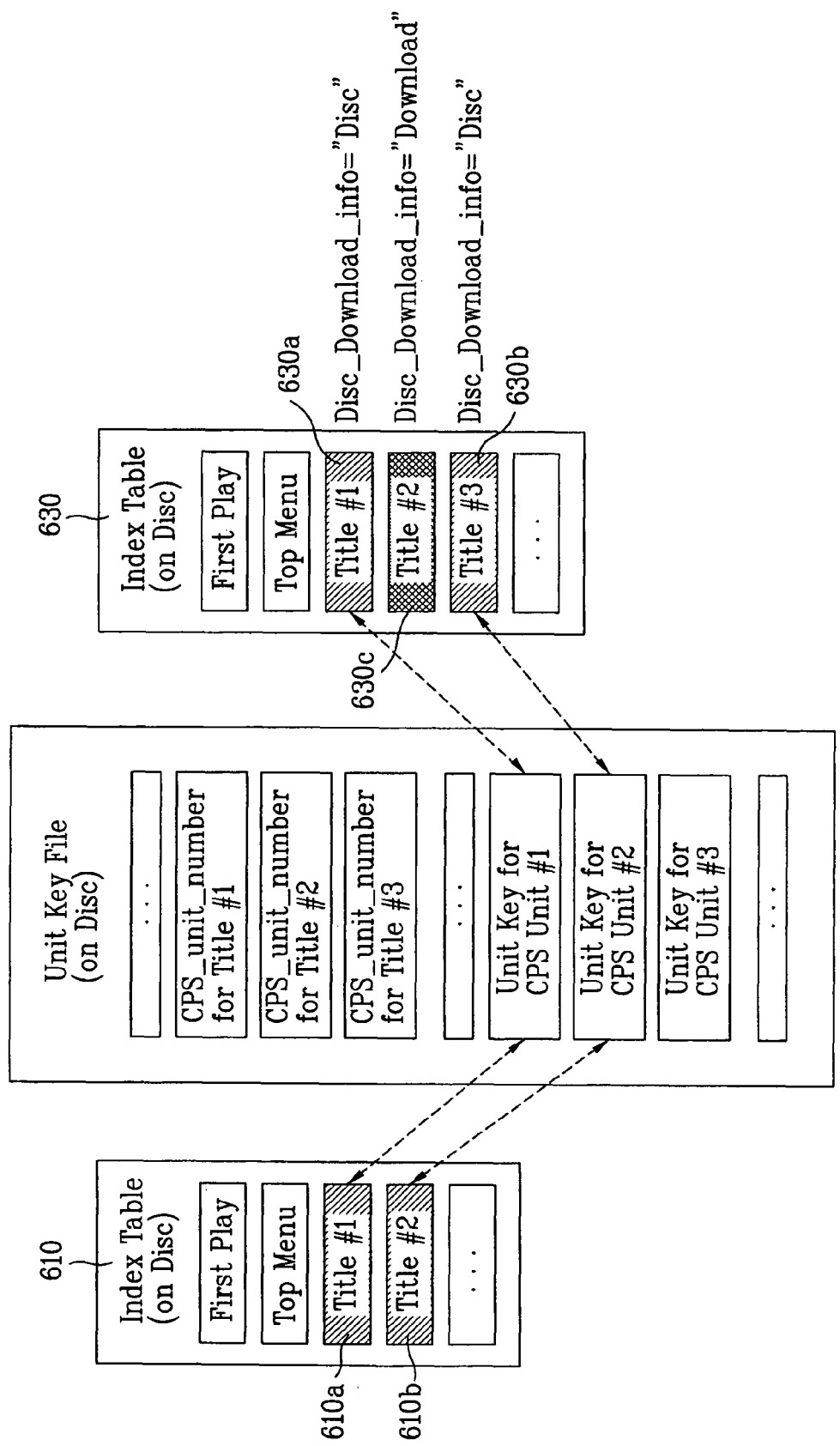
Figure 10:
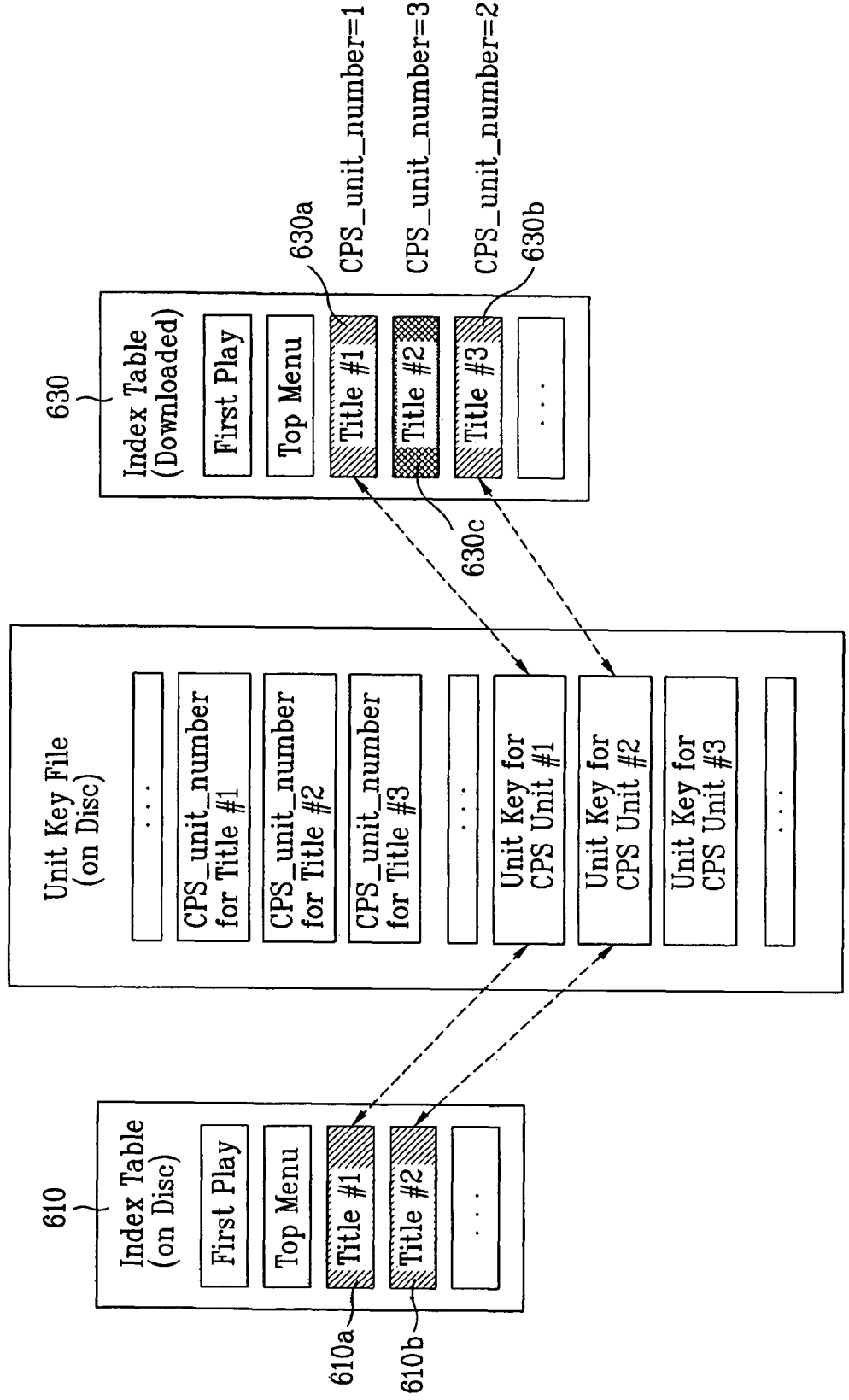
FIG. 10 is a diagram of a method of reproducing a recording medium using a local storage according to a second embodiment of the present invention.
Figure 11:
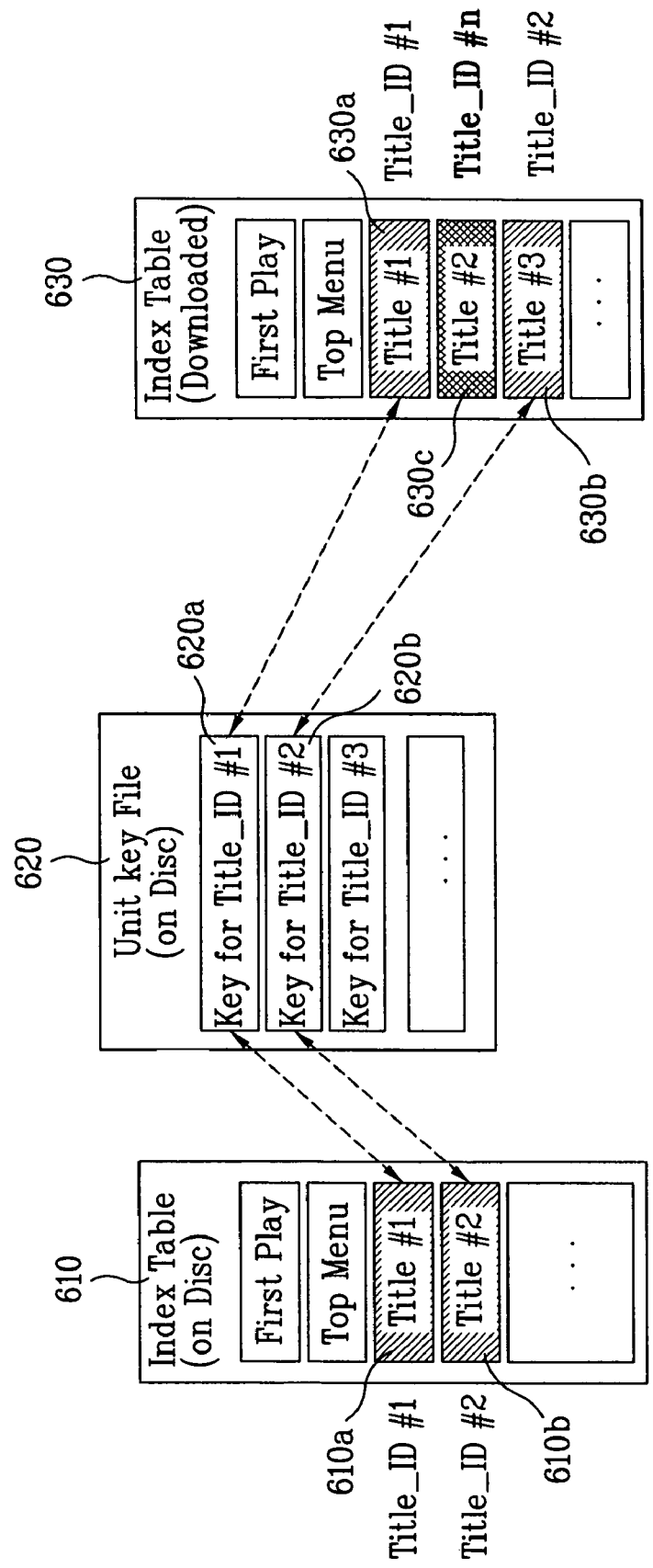
FIG. 11 is a diagram of a method of reproducing a recording medium using a local storage according to a third embodiment of the present invention.

FIGS. 9 to 11 show various methods of reproducing a recording medium using a local storage according to embodiments of the present invention.

FIG. 9A or FIG. 9B shows that information for identifying whether an indexing item of an index table 630 within a virtual package corresponds to indexing item on a disc or downloaded indexing item exists in the virtual package. FIG. 10 shows that encryption information about an indexing item exists in an index table 630 within a virtual package. And, FIG. 11 shows that identification information about an indexing item exists in an index table 630 with a virtual package.

In the following description, explained is a case of decryption and reproduction of data by reading a key from a unit key file stored within a disc for example. In some cases, a key is read from a unit key file constructed with a separate file within a local storage. In some cases, a key is read from a unit key file stored within a disc for a data recorded on a disc, whereas a key is read from a unit key file within a local storage for a downloaded data. In some cases, if keys for decryption of encrypted data do not exist in a disc and a local storage, a separate key can be downloaded.

FIG. 9A and FIG. 9B are diagrams of a method of reproducing a recording medium using a local storage according to a first embodiment of the present invention.

FIG. 9A shows an example of decryption and reproduction of an indexing item of an index table within a virtual package using information identifying a downloaded indexing item and a indexing item on a recording medium. The information exists in a database area such as an index table and the like. And, FIG. 9B shows an example of a method of reproducing a recording medium using a local storage according to an embodiment of the present invention in case that a unit key file includes "CPS_unit_number".

Referring to FIG. 9A, a unit key file 620 includes keys that are defined with reference to indexing items of data recorded on a disc. Namely, the unit key file is associated with the disc. "Key for Title #1" 620 *a* is a decryption key of Title #1 610*a* recorded within the disc and "Key for Title #2" 620*b* is a decryption key of Title #2 610*b* recorded within the disc Title #1 and Title #2 within the disc correspond to title #1 630*a* and Title #3 630*b* in an index table 630 within a virtual package. And, Title #2 of the index table 630 within the virtual package is a downloaded Title.

To reproduce an indexing item of the index table 630 within the virtual package, a corresponding title preferentially needs to be decrypted. A decryption key of Title #1 of the index table 630 within the virtual package is "Key for Title #1" 620 *a* in the unit key file 620. In this case, Title #1 as the indexing item of the index table 630 within the virtual package coincides with Title #1 that is the indexing item used by the unit key file 620.

Yet, in case of Title #3 630*b* of the index table 630 within the virtual package, a decryption key of the Title #3 is not "Key for Title #3" but "Key for Title #2" 620*b*. Hence, Title #3 as the indexing item of the index table 630 within the virtual package is mismatched to Title #3 as the indexing item in the unit key file for the decryption key of the indexing item. So, "Key for Title #3" unsuitable for decryption of the Title #3 630*b* may be read out unless information for solving the mismatch problem is given.

Hence, in the present invention, information indicating whether the indexing item is downloaded or recorded on the disc can be provided within the index table 630 of the virtual package. So, a player can read out a key suitable for decrypting the indexing item using the provided information. Hereinafter the information is named "Disc_Download_info".

In particular, as Title #1 630*a* and Title #3 630*b* of the index table 630 within the virtual package are titles recorded within the disc, information named "Disc" as "Disc_Download_info" is provided to the index table within the virtual package. It means that those titles are recorded on the disc. As Title #2 630*c* is a downloaded Title, information named "Download" is provided to the index table within the virtual package.

The player can identify whether an indexing item is the indexing item recorded on the disc or the downloaded indexing item via the "Disc_Download_Info". So, by computing the indexing item recorded on the disc only, it can be matched to the indexing item of the unit key file. For instance, once a reproduction command for Title #3 is given, the player computes data recorded within the disc only from "Disc_Download_info" to know that the Title #3 630*b* corresponds to Title #2 in the unit key file 620. The player then reads out "Key for Title #2" 620*b* to decrypt and reproduce the Title #3 630*b*.

Like FIG. 9A, FIG. 9B shows that information identifying whether an indexing item is downloaded or recorded on the disc. Yet, FIG. 9B differs from FIG. 9A in that a unit key file is configured with "CPS_unit_number" and "Unit Key" defined with reference to "CPS Unit".

"CPS_unit_number for Title #1" in a unit key file stored within a disc is the information indicating "CPS Unit" to which Title #1 610*a* among indexing items of an index table 610 stored within the disc belongs. In the embodiment shown in FIG. 9B, the Title #1 610*a* belongs to "CPS Unit #1". And, "Unit key for CPS Unit #1" is required for reproducing the Title #1. Moreover, Title #2 610*b* of the index table 610 belongs to "CPS Unit #2" and can be reproduced by being decrypted by "Unit key for CPS Unit #2".

The Title #1 610*a* and Title #2 610*b* recorded within the disc correspond to Title #1 630*a* and Title #3 630*b* in an index table 630 within a virtual package, respectively. And, Title #2 630*c* within the index table 630 of the virtual package is a downloaded title.

"CPS_unit_number for Title #1" of the unit key file is the information about "CPS Unit" to which Title #1 of the index table 630 within the virtual package belongs. And, an indexing item of the index table 630 within the virtual package is matched to an indexing item of the unit key file. Hence, once a reproduction command for Title #1 of the index table 630 within the virtual package is given, "Unit Key for CPS Unit #1", which is a decryption key of the Title #1, is read out.

Yet, since information about "CPS Unit", to which Title #3 630*b* of the index table within the virtual package belongs, becomes "CPS_unit_number for Title #2" in the unit key file, indexing items Title #3 and Title #2 are mismatched. In case that separate information is not given, a player can confirm "CPS_unit_number" for the same indexing item of the Title #3 630*b* in the unit key file if a reproduction command for Title #3 630*b* of the index table 630 within the virtual package is given. In this case, a read-out key can be "Unit Key for CPS Unit #3" instead of "Unit Key for CPS Unit #2" used in decrypting the Title #3 630*b*.

If "Disc_Download_info" for an indexing item is provided to the index table 630 within the virtual package according to the present invention, a player can know that the Title #3 630*b* corresponds to Title #2 in the unit key file in a manner of computing Title recorded within the disc only. Hence, once a reproduction command for the Title #3 630*b* is given, the player confirms "CPS_unit_number for Title #2" and then reads out "Unit Key for CPS Unit #2" using the "CPS_unit_number for Title #2".

Besides, it is apparent that terminologies used in FIG. 9A and FIG. 9B do not put limitation on the present invention. And, any information for solving a problem of a mismatch between indexing items of a unit key file and index table within a virtual package comes within the scope of the appended claims and their equivalents of the present invention.

FIG. 10 is a diagram of a method of reproducing a recording medium using a local storage according to a second embodiment of the present invention, in which an indexing item is decrypted and reproduced using encryption information for the indexing item existing in an index table within a virtual package.

Like FIG. 9A and FIG. 9B, information for solving an indexing item mismatch problem is provided to a database file such as an index table and the like. Yet, FIG. 10 differs form FIG. 9A or FIG. 9B in that encryption information about an indexing item of an index table within a virtual package is provided as the information for solving the indexing item mismatch problem.

Referring to FIG. 10, information about "CPS Unit", to which an indexing item of an index table 630 within a virtual package belongs, is provided as encryption information to the index table 630 within the virtual package for example. And, information about CPS Unit to which an indexing item belongs may be "CPS_unit_number".

Title #1 630a of the index table 630 within the virtual package corresponds to Title #1 610a within a disc and belongs to "CPS Unit #1". Title #3 630b of the index table 630 within the virtual package corresponds to Title #2 610b within the disc and belongs to "CPS Unit #2". Hence, the Title #1 630a and Title #3 630b of the index table 630 within the virtual package can be decrypted by "Unit Key for CPS Unit #1" and "Unit Key for CPS Unit #2", respectively. Title #2 of the index table 630 within the virtual package is a downloaded title and belongs to "CPS Unit #3". Hence, in order to reproduce the Title #2 630c, the Title #2 630 should be decrypted by "Unit Key for CPS Unit #3".

In order to reproduce Title #1 630a, Title #2 630c and Title #3 530b of the index table 630 within the virtual package, a proper key should be read from the unit key file. Information about "CPS Unit" to which the Title #1 belongs in the unit key file is "CPS_unit_number for Title #1". Hence, an indexing item of the index table 630 within the virtual package is matched to an indexing item used in the unit key file.

Yet, since Title #3 630b of the index table 630 within the virtual package corresponds to Title #2 in the unit key file, an indexing item of the index table 630 within the virtual package is mismatched to an indexing item used in defining "CPS_unit_number" in the unit key file. In case that a mismatch of the indexing items takes place, a player may read out a key corresponding to "CPS_unit_number" by confirming "CPS_unit_number" in the unit key file with reference to Title #3 630b as the indexing item of the index table 630 within the virtual package. For instance, in case that "CPS_unit_number for Title #3" in the unit key file is "3", the player may read out "Unit Key for CPS Unit #3" by deciding that Title #3 630b of the index table 630 within the virtual package corresponds to "CPS Unit #3". Yet, there occurs a problem that the Title #3 630b, which belongs to "CPS Unit 32", cannot be reproduced by the "Unit Key for CPS Unit 33".

To solve this problem, the present invention provides encryption information for an indexing item of the index table 630 within the virtual package. For instance, "CPS_unit_number=1", "CPS_unit_number=3" and "CPS_unit_number=2" can be provided for Title #1, Title #2 and Title #3 of the index table 630 within the virtual package, respectively.

Once a reproduction command for an indexing item of the index table 630 within the virtual package is given, the player confirms "CPS_unit_number" for each indexing item and then reads out "Unit Key" for "CPS Unit" to which each item belongs. In particular, "Unit Key for CPS Unit #1" is read from the unit key file for Title #1 630a of the index table 630 within the virtual package, "Unit Key for CPS Unit #3" is read for Title #2 630C, and "Unit Key for CPS Unit #2" is read out for Title #3 630b. The corresponding titles are decrypted using the read-out key and are then reproduced, respectively.

In the present invention, even if the indexing item used in the unit key file is mismatched to the indexing item of the index table 630 within the virtual package, a proper key can be read out. Hence, the present invention enables a smooth reproduction of the indexing item of the index table 630 within the virtual package.

FIG. 11 is a diagram of a method of reproducing a recording medium using a local storage according to a third embodiment of the present invention, in which an indexing item is decrypted and reproduced using identification information for the indexing item existing in an index table within a virtual package.

Like FIGS. 9A to 10, information for solving an indexing item mismatch problem between a unit key file and an index table within a virtual package is provided to a database file. Yet, FIG. 11 differs form FIGS. 9A to 10 in indexing item identification information assigned to each indexing item is provided as the information for solving the indexing item mismatch problem.

An example of granting "Title_ID" as identification information for an indexing item is explained in the following description. Yet, the present invention does not put limitation on terminologies used in the description of FIG. 11 and should be understood based on its technical idea.

Referring to FIG. 11, "Title_ID #1" is granted as indexing item identification information to Title #1 610a of an index table 610 stored within a disc and "Title_ID #2" is granted to Title #2 610b. And, a unit key file 620 includes a key defined with reference to the identification information.

Preferably, the identification information is separately granted to each indexing item. In particular, the identification information is just separately granted to each indexing item but it is unnecessary to grant different identification information to each indexing item. In case that different identification information is granted, the corresponding indexing item is reproduced after being decrypted with a different key. In case that an indexing item has the same identification information, the corresponding indexing item is reproduced after being decrypted with the same key.

Preferably, the granted indexing item identification information is not changed even if a position of an indexing item in an index table within a disc is changed in an index table within a virtual package. In the embodiment shown in FIG. 11, Title #1 630a and Title #3 630b as indexing items of an index table 630 within a virtual package reproduce the same data of Title #1 610a and Title #2 610b as indexing items recorded on a disc, respectively. As indexing item identification information of Title #1 610a recorded on a disc is "Title_ID #1", indexing item identification information of Title #1 630a of the index table within the virtual package corresponds to "Title_ID #1" as well. As indexing item identification information of Title #2 610b recorded on a disc is "Title_ID #2", indexing item identification information of Title #3 630b of the index table within the virtual package corresponds to "Title_ID #2" as well. And, separate identification information is granted to Title #2 630c of the index table 630 within the virtual package. An example of granting "Title_ID #n" is shown in FIG. 11.

In the present invention, indexing item identification information can be provided to a database file such as an index table and the like as information for solving an indexing item mismatch problem. The mismatch occurs between a indexing item of the index table within the virtual package and an indexing item of a unit key file associated with a disc. Hence, "Title_ID #1" as indexing item identification information for Title #1 630a of the index table 630 within the virtual package, "Title_ID #n" as indexing item identification information for Title #2 630c, and "Title #2" as indexing item identification information for Title #3 630b can be provided to the index table 630 within the virtual package.

Once a reproduction command for an indexing item of the index table 630 within the virtual package is given, a player confirms identification information for the indexing item, reads a key corresponding to the indexing item identification information from the unit key file, decrypts the indexing item using the read-out key, and then reproduces the decrypted indexing item. In particular, once a reproduction command for Title #1 630a of the index table 630 within the virtual package is given, "Key for Title_ID #1" 620a as a key for the identification information is read from the unit key file by confirming that the identification information for the Title #1 is "Title_ID #1". Once a reproduction command for Title #3 630b of the index table 630 within the virtual package is given, "Key for Title_ID #2" 620b is read out by confirming that identification information for the Title #3 is "Title_ID #2".

"Key for Title_ID #1" 620 a and "Key for Title_ID #2" 620b, which are read out for the Title #1 630a and the Title #3 630b, respectively, are decryption keys of the data reproduced according to the titles, respectively. Hence, each of the titles can be decrypted.

Since identification information of downloaded Title #2 630c of the index table 630 within the virtual package is "Title_ID #n", "Key for Title_ID #n" is needed to reproduce the Title #2 630c. In case that the "Key for Title_ID #n" exists in the unit key file stored within the disc, the key can be read from the unit key file. Yet, in case that the key does not exist in the unit key file, it should be downloaded.

In the present invention, indexing item identification information is assigned to each indexing item of the index table 610 stored within the disc and each indexing item for the downloaded data. And, a key is defined and managed in the unit key file with reference to the corresponding identification information. Through this, even if a position of an indexing item reproducing a prescribed data is changed by addition or deletion of another indexing item in the index table, a decryption key suitable for the data to be reproduced can be read out.

Besides, in case of encrypting data to record on a disc, a disc author grants unique identification information to the encrypted data, stores a unit key file including a key defined with reference to the identification information in a recording medium, and provides the recording medium to a user. In this case, the unit key file may include another key separately stored for a downloaded data as well.

Figure 12:
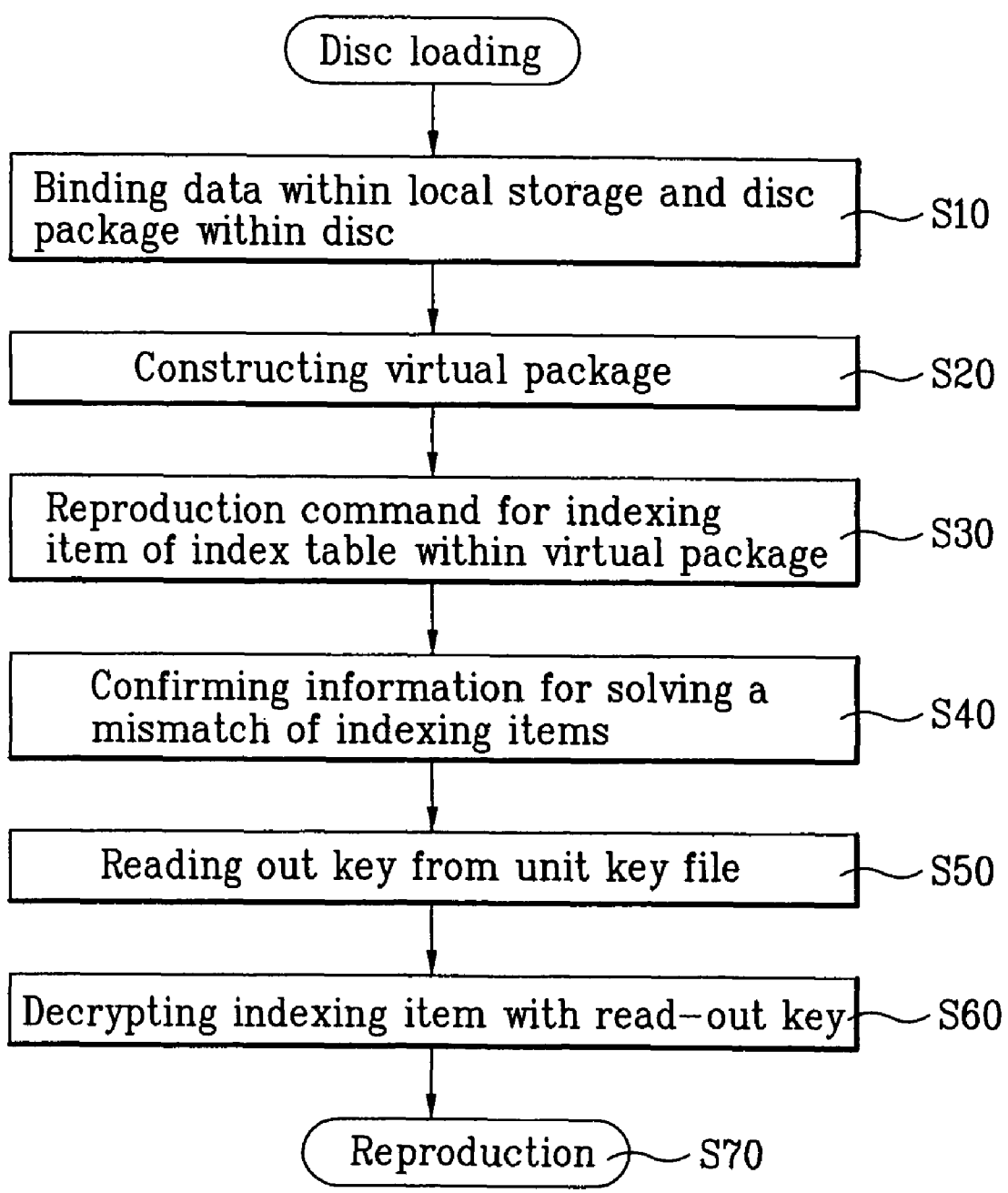
FIG. 12 is a flowchart of a method of reproducing a recording medium using a local storage according to the present invention.

FIG. 12 is a flowchart of a method of reproducing a recording medium using a local storage according to the present invention.

Referring to FIG. 12, once a disc is loaded, data associated with the disc, i.e. a binding unit is read from a local storage. The binding unit is bound to a file structure within the disc (S20) to construct a virtual package (S20). This is called a binding operation. The virtual package includes an index table. And, a unit of data reproduced via an indexing item of the index table within the virtual package configures an interface with a user.

Once a reproduction command for the indexing item of the index table within the virtual package is given (S30), a player confirms information for solving an indexing item mismatch between the index table within the virtual package and a unit key file (S40). A decryption key of the corresponding indexing item is then read from the unit key file using the information (S50).

Besides, the unit key file may be stored within the disc or may be separately configured within the local storage. The unit key file within the local storage can be configured by reading out a unit key file stored within the disc or can be configured to include a key downloaded from outside of the disc.

Once a decryption key of the indexing item is read out (S50), the indexing item and key are provided to a contents decryption module so that the indexing item can be decrypted using the read-out key (S60). The decrypted indexing item is then reproduced by a decoder to be provided to a user (S70).

An apparatus for reproducing a recording medium using a local storage according to the present invention is explained with reference to FIG. 4A as follows.

Referring to FIG. 4A, An apparatus for reproducing a recording medium according to the present invention includes a pickup 11 reading data from the recording medium, a local storage 15 storing downloaded data associated with the recording medium, and a controller 12 constructing a virtual package by binding the downloaded data to a disc package within the recording medium, the controller 12 decrypting an indexing item of an index table within the virtual package using a key within a key file associated with the recording medium, the controller reproducing the decrypted indexing item. In particular, in case that the indexing item of the index table within the virtual package is mismatched to an indexing item of the key file, the controller 12 reads out a suitable decryption key of the indexing item to be reproduced using information for solving the mismatch within the virtual package.

Besides, the index table within the virtual package can be provided from an outside of the recording medium by a content provider.

The information for solving the indexing item mismatch can be the information that can identify whether the indexing item of the index table is configured with including the downloaded data.

And, the information may be the information for a CPS unit to which the indexing item of the index table belongs. It is also possible to provide indexing item identification information as the information.

The information may exist in a database file such as an index table and the like. It is a matter of course that the database file can configure the virtual package in part.

In transmitting data associated with a recording medium according to the present invention, a content provider can transmit information for solving a mismatch of indexing items that occurs between an indexing item of an index table enabling a reproduction of the data and an indexing item of a key file associated with the recording medium.

And, the information may identify whether the indexing item of the index table is constructed with including the downloaded. Moreover, the information may be the information about a CPS unit to which the indexing item of the index table belongs or indexing item identification information.

The present invention enables an efficient reproduction of data reproduced by the indexing item of the index table that reproduces the downloaded data and the recording medium data together, thereby providing more convenient functions to a user. And, a content provider can provide contents more safely.

Accordingly, the present invention provides the following effect or advantage.

First of all, the data associated with the recording medium is downloaded from outside to the local storage while contents provided by a content provider are protected. And, both of the data within the recording medium and the data within the local storage can be efficiently reproduced using a virtual package. Therefore, the present invention can provide more convenient functions to a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data recorded on a recording medium using a local storage, comprising the steps of:
   downloading data associated with the recording medium to the local storage;
   constructing a virtual package by binding the downloaded data to the data recorded on the recording medium according to name mapping information, the virtual package is data structure storing the downloaded data and the data recorded on the recording medium, the name mapping information including file location and file name of the downloaded data within the virtual package;
   decrypting an indexing item of an index table within the virtual package using a decryption key of the indexing item within a key file associated with the recording medium, the indexing item indicating the data recorded on the recording medium or the downloaded data, the decryption key being selected out from the key file using link information between the indexing item and the decryption key, the link information including identification number of a content protection unit to which the indexing item belongs, the content protection unit is data group of the indexing items encrypted using same encryption key; and
   reproducing the decrypted indexing item based on the constructed virtual package,
   wherein the step of constructing the virtual package comprises the steps of:
   generating a binding unit including the downloaded data by using the name mapping information, the name mapping information including list of the downloaded data configuring the binding unit;
   binding the binding unit to the data recorded on the recording medium to construct the virtual package according to the name mapping information; and
   changing file names of all files within the binding unit.

2. The method of claim 1, wherein the link information includes information identifying whether the indexing item is the downloaded data or not.

3. The method of claim 1 wherein the link information is stored in the key file.

4. The method of claim 1, wherein the link information includes indexing item identification information granted to each indexing item.

5. The method of claim 4, wherein if the index table includes a newly added indexing item including the downloaded data, new indexing item identification information is granted to the newly added indexing item.

6. The method of claim 1, wherein the key file is located in the recording medium.

7. The method of claim 1, wherein the key file includes a downloaded key and is located in the local storage.

8. The method of claim 1, wherein the link information is downloaded from outside the recording medium.

9. The method of claim 1, wherein the link information is located in the recording medium.

10. An apparatus for reproducing data recorded on a recording medium using a local storage, comprising:
    a pickup configured to read the data recorded on the recording medium;
    a local storage configured to store downloaded data associated with the recording medium; and
    a controller configured to:
    construct a virtual package by binding the downloaded data to the data recorded on the recording medium according to name mapping information, the virtual package is data structure storing the downloaded data and the data recorded on the recording medium, the name mapping information including file location and file name of the downloaded data within the virtual package,
    decrypt an indexing item of an index table within the virtual package using a decryption key within a key file associated with the recording medium, the indexing item indicating the data recorded on the recording medium or the downloaded data, the decryption key being selected out from the key file using link information between the indexing item and the decryption key, the link information including identification number of a content protection unit to which the indexing item belongs, the content protection unit is data group of the indexing items encrypted using same encryption key, and
    control the decrypted indexing item to be reproduced based on the constructed virtual package,
    wherein the controller is further configured to:
    generate a binding unit including the downloaded data by using the name mapping information, the name mapping information including list of the downloaded data configuring the binding unit;
    bind the binding unit to the data recorded on the recording medium to construct the virtual package according to the name mapping information, and
    change file names of all files within the binding unit.

11. The apparatus of claim 10, wherein the link information includes information identifying whether the indexing item is the downloaded data or not.

12. The apparatus of claim 10, wherein the link information is stored in the key file.

13. The apparatus of claim 10, wherein the link information includes indexing item identification information.

14. The apparatus of claim 10, wherein the controller is configured to downloads the link information from outside the recording medium.

15. The apparatus of claim 10, wherein the controller is configured to read out the link information from the recording medium.

* * * * *